(12) United States Patent
Solh et al.

(10) Patent No.: US 12,299,054 B2
(45) Date of Patent: May 13, 2025

(54) EVENT-BASED CUSTOMIZED RECOMMENDATIONS IN A DISTRIBUTED NETWORK

(71) Applicant: Block, Inc., Oakland, CA (US)

(72) Inventors: Crissy Solh, Dublin, CA (US); Neil Long, Dublin (IE); Sarah Edwards, New Orleans, LA (US); Ghazal Niazi, Seattle, WA (US); Ashley Yee, Los Angeles, CA (US); Alana Joyce, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/394,265

(22) Filed: Dec. 22, 2023

(65) Prior Publication Data
US 2024/0330376 A1 Oct. 3, 2024

Related U.S. Application Data

(63) Continuation of application No. 17/958,184, filed on Sep. 30, 2022, now Pat. No. 11,893,067.

(51) Int. Cl.
*G06F 16/00* (2019.01)
*G06F 11/34* (2006.01)
(Continued)

(52) U.S. Cl.
CPC ........ *G06F 16/951* (2019.01); *G06F 11/3438* (2013.01); *G06F 16/9535* (2019.01); *G06F 16/9536* (2019.01)

(58) Field of Classification Search
CPC .. G06F 16/2428; G06F 9/546; G06F 11/3438; G06F 16/951; G06F 16/9535; G06F 16/9536; G06F 16/958; G06F 16/27; G06F 18/22; G06F 18/23; G06F 18/241; G06F 9/466; G06F 9/543; G06F 21/64; G06F 8/36; G06Q 20/384; G06Q 20/10; G06Q 20/405; G06Q 20/386; G06Q 20/40; G06Q 20/3255; G06Q 20/108;
(Continued)

(56) References Cited

U.S. PATENT DOCUMENTS 8,473,421 B2 6/2013 Scalisi
11,893,067 B1 2/2024 Solh et al.
(Continued)

*Primary Examiner* — Shyue Jiunn Hwa
(74) *Attorney, Agent, or Firm* — Polsinelli PC

(57) ABSTRACT

A payment service system monitors data associated with a dynamic information feed and determines trending causes based on the monitoring. The system accesses user information associated with a user and identifies a trending cause that is relevant to the user based on the user information. The system transmits, to the user's mobile device, a recommendation alert that is formatted based on a local application on the user's mobile device, and causes the user's mobile device to surface the recommendation alert to recommend the relevant trending cause within the local application. The system receives an indication of an interaction with the recommendation alert via the user's mobile device. In response, the system facilitates a transfer of at least one asset from an account associated with the user to at least one account associated with at least one recipient entity associated with the relevant trending cause according to a specified distribution.

21 Claims, 15 Drawing Sheets

(51) Int. Cl.
*G06F 16/951* (2019.01)
*G06F 16/9535* (2019.01)
*G06F 16/9536* (2019.01)

(58) Field of Classification Search
CPC .. G06Q 20/223; G06Q 20/227; G06Q 20/229; G06Q 20/351; G06Q 20/4016; G06Q 30/0207; G06Q 30/06; G06Q 40/02; H04L 67/02; H04L 12/1818; H04L 51/52; H04L 63/08; H04L 67/306; H04L 9/50; A01K 39/014; A01K 39/02; A01K 39/0206; G06N 20/00
See application file for complete search history.

(56) References Cited

U.S. PATENT DOCUMENTS

| | | |
|---|---|---|
| 2011/0202874 A1 | 8/2011 | Ramer et al. |
| 2012/0290950 A1 | 11/2012 | Rapaport et al. |
| 2018/0005201 A1 | 1/2018 | Jacobson |
| 2020/0242669 A1 | 7/2020 | Carroll et al. |
| 2021/0082005 A1 | 3/2021 | David et al. |
| 2021/0390549 A1* | 12/2021 | Rule ................. G06Q 20/4016 |
| 2022/0198409 A1* | 6/2022 | Derhalli .............. G06Q 20/065 |

* cited by examiner

EVENT-BASED CUSTOMIZED RECOMMENDATIONS IN A DISTRIBUTED NETWORK

CROSS-REFERENCE TO RELATED APPLICATIONS

This application is a Continuation of U.S. patent application Ser. No. 17/958,184 filed Sep. 30, 2022, entitled "CAUSE IDENTIFICATION USING DYNAMIC INFORMATION SOURCE(S)", the full disclosure of which is incorporated herein by reference in its entirety.

TECHNICAL FIELD

Multiple, disparate sources provide dynamic information feeds via local applications and/or webpages presented via computing devices. Examples sources are social media applications, news portals, and weather applications. The information feeds offer information that changes dynamically, and in real time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.

DETAILED DESCRIPTION

Figure 1:
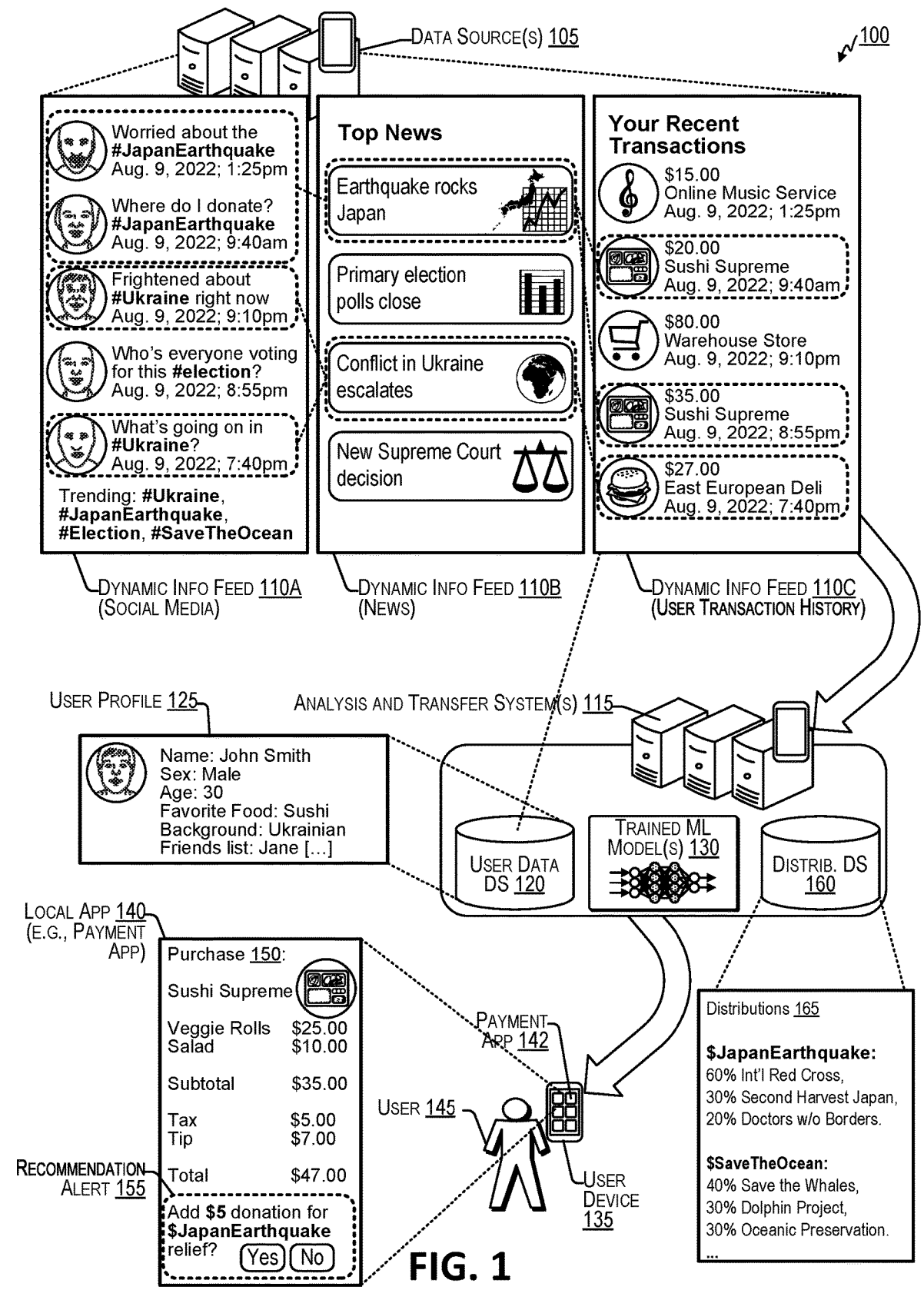
FIG. 1 is a block diagram illustrating an architecture of an analysis and transfer service system, in accordance with some examples.

Systems and methods to apply to information sources and/or feeds for identifying topics and/or trends is described herein. Further, in some implementations, the systems and methods disclosed herein surface such topics and/or direct the topics to contextualize experiences in a payment service system, for instance using an analysis and transfer system of the payment service system. The payment service system may be referred to as a payment platform and/or a payment service environment. In one implementation, the payment service system can automatically, and without user intervention, generate events or causes related to identified topics. For example, information sources such as dynamic information feeds, (e.g., social media feeds, news feeds, weather feeds), websites, databases, and the like, can be contextualized to report various contextual topics covering causes relating to world events or specific regions, such as natural disasters, social issues, climate issues, and the like. Techniques and systems described herein relate to creating and facilitating an asset transfer relating to topics determined to be relevant to a user. In at least one example, the payment service system monitors a dynamic information feed in real-time, parses or otherwise processes the information feed, and determines topics within the information feed that occur above a frequency within a period of time based on the monitoring, parsing, and/or processing. In some examples, such topics can represent "causes," which can be determined to be "trending" based on the frequency and/or recency of the topic in the data associated with the dynamic information feed. A cause may be a type of topic, or vice versa. In some examples, a cause includes an association between a topic and a distribution of one or more recipient entities for an asset transfer, such as charities, non-profit organizations, merchants, governmental entities, and the like.

In at least one example, the payment service system queries user information associated with a user, such as payments made using the payment service system, recipients of such payments, items purchased via such payments, reasons for making such payments (e.g., as identified from subject lines or transaction data of such payments), other transactions or interactions associated with the payment service system, geolocations associated with payments, transactions, or interactions, connections between users of the payment service system, social networking connections, content streaming of users, interactions of users on third-party platforms, and/or the like. Such user information can be analyzed to determine preferences (implicit or explicit) of individual users and/or context associated with such payments, transactions, or interactions. The payment service system can associate topics and/or causes, which may or may not be trending, with individual users based on determined preferences or other context associated with such payments. That is, techniques described herein can leverage context and/or other user information of users to identify topics and/or causes that are relevant to such users In some examples, the payment service system can determine whether to generate an event, account, and/or profile associated with a cause to configure a receiving entity for receiving assets from other users associated with the payment service system and/or if a cause can be obtained from another platform via an integration. In some examples, techniques described herein can then generate events, accounts, and/or profiles relevant to such causes, surface such causes as part of events, accounts, and/or profiles, via recommendation alerts (e.g., which can be actionable recommendations), as described below, and can enable such events to be shared and/or presented across multiple, disparate platforms.

In an example, a payment service system accesses user information associated with a user, and identifies a cause that is relevant (and in some implementations, trending) to the user based on the user information. In some examples, the payment service system can utilize trained machine-learning mechanisms to intelligently identify associations between causes and users In examples, the payment service system transmits, to a user mobile device associated with the user, a recommendation alert that is formatted based on a local application that is stored on the user mobile device, and causes the user mobile device to output the recommendation alert to recommend the cause that is relevant to the user within an interface of the local application on the user mobile device. In some examples, the recommendation alert is output in context, that is, proximate to data in a dynamic information feed to which the recommendation alert is relevant, for example as an interstitial or within a web or mobile application. In some examples, the recommendation alert can be output in association with a transaction or other interaction between the user and the payment service system (e.g., in association with a point-of-sale transaction, while a song is being streamed, etc.).

In some examples, the recommendation alert can be interactive and/or interactable such that an interaction with the recommendation alert can initiate, and/or in some examples complete, a process for transferring asset(s) to the cause. The payment service system receives an indication of an interaction with the recommendation alert via the user mobile device. In response, the payment service system facilitates at least one transfer of at least one asset from an account associated with the user to at least one account associated with at least one specified recipient entity associated with the cause that is relevant to the user according to a specified distribution. In some examples, one or more rules and/or policies can be applied by the payment service system to enable assets donated to the cause to be allocated among or between one or more recipient entities. In some examples, such allocation can be intelligent in that the payment service system can utilize machine-learning techniques to determine how to allocate assets donated to causes.

In at least one example, the payment service system can facilitate the payment of such assets to the one or more recipient entities. That is, techniques described herein can provide an end-to-end framework for surfacing relevant causes and transferring assets to entities associated with such relevant causes.

By providing such an end-to-end framework, the techniques and systems described herein provide a technical improvement over other systems that only provide dynamic information feeds (e.g., social media platforms) or that only facilitate payments for causes (e.g., crowdfunding platforms). Such other systems are inefficient, for instance providing an avenue to discover causes without a way to donate or do anything about them, or providing a way to donate to causes without any indication of trend or importance to individual users. The techniques and systems described herein provide a technical improvement by providing efficient context-based bridges and links between dynamic information feeds and payment facilitation. For instance, the techniques and systems described herein can automatically analyze dynamic information sources to identify causes (e.g., trending causes), can automatically set up identifiers and/or account(s) for assets to be transferred for the identified causes, can automatically determine distributions according to which different entities (e.g., different charities, merchants, governments, users, and the like) are to receive assets transferred for a specific cause, can automatically recommend causes to users based on user contextual information, and can automatically facilitate transfers of assets to the entities and/or account(s) associated with a cause based on a user selecting the cause (e.g., by accepting the recommendation). Making an automatic link between dynamic information sources and transfer of assets for a particular cause is efficient and frictionless, and allows users to go from dynamic information feed to asset transfer (e.g., donation, purchase from a merchant, peer to peer (P2P) transfer, etc.) with no changes, or minimal changes, between different websites, apps, and/or user interfaces. For instance, in some examples, the techniques and systems described herein provide an interactive interface element allowing the user to initiate a transfer for a cause within a dynamic information feed, for instance, adjacent to an information feed element corresponding to that cause in the dynamic information feed.

As described above, the techniques and systems for facilitating asset transfer based on causes (e.g., trending causes) relevant to a user that are described herein can include a payment service system that provides the local application to the user mobile device associated with a user for installation on the user mobile device. The payment service system can cause, based on transmitting the recommendation alert, the user mobile device to activate the local application to output (e.g., display) the recommendation alert using the user mobile device to recommend a cause that is relevant to the user within an interface of the local application on the user mobile device. In some examples, the payment service system can cause the user mobile device to activate the local application to output (e.g., display) the recommendation alert and to enable connection of the user mobile device to the payment service system over at least one network (e.g., over the Internet) based on the payment service system and/or the user mobile device coming online.

In some examples, the payment service system addresses an Internet-centric challenge of alerting a user with time-sensitive information (e.g., a trending cause and/or recommended cause) even when the user mobile device is offline, for instance by activating the local application on the user mobile device when the payment service system and/or the user mobile device come online, and/or by causing the payment service system and/or the user mobile device to come online and activate the local application. The payment service system addresses an Internet-centric challenge of alerting a user with time-sensitive information (e.g., a trending cause and/or recommended cause) even when an associated local application is closed or in the background, for instance by bringing the local application on the user mobile device from the background or closed state to a foreground state, which can be referred to as surfacing the local application. In some examples the techniques and systems described herein can surface the local application to provide a recommended cause and/or to facilitate a transfer to at least one entity associated with the recommended cause in response to a trigger condition. Trigger conditions can include conditions under which the cause is relevant, and/or under which the user is already approving paying for something else, such as when the user is at a POS of a merchant associated with the cause, while the user is listening to a song by an artist associated with the cause, when sending or receiving a P2P payment to or from a second user who is connected to the cause, or a combination thereof.

In some examples, the techniques and systems described herein further provide customized recommendations for individual users and for individual local applications, for instance based on identified topics from dynamic information sources and based on user information from a user data data store. In some examples, the system provides user-level customization even when sifting through enormous volumes of data in the dynamic information feeds without becoming intractably complex, for instance, by comparing information about causes (e.g., trending causes) to stored information about the user (e.g., demographic information, transaction histories, and the like) This improves efficiency in the user interface and experience, and also dramatically reduces bandwidth usage and data storage requirements by limiting what is shared with users to recommended causes that are determined to be relevant to the user.

In some examples, the techniques and systems described herein further provide customized interactive elements, such as specially configured identifiers having a particular syntax, quick response (QR) codes, or near field communication (NFC) tags, that can be generated on-the-fly, for example, in response to identification of causes (e.g., trending causes), and can each automate transfer of recommendation alerts (e.g., with recommendation(s) for payment transaction(s) and/or asset transfer(s)), to user devices or between user devices. In some examples, the customized interactive elements can be associated with recommendation alerts. In some examples, an interaction with the interactive elements provides a technical solution to improve security by providing additional factors of authentication (e.g., two-factor authentication or N-factor authentication, where N is greater than or equal to two) for a transfer, on top of other factors of authentication such as passwords, personal identification number (PIN) codes, signatures and the like.

In some examples, integrations and/or synergies between system components can enable techniques and systems described herein to provide efficiencies. For example, in some examples, the techniques and systems described herein further provide automated designing, creating, and importing data into a viewable form, such as a tax return document, from outside applications such as information sources, dynamic data feed sources, user data data stores, local applications on a user device, recommendations generated based on these, and the like, for instance by deriving the context of the imported data and formatting in a form that is contextually relevant. The techniques and systems described herein can automatically populate relevant fields the viewable forms with such data based on comparison of context information in the data with context information (e.g., field names) in the viewable forms to ensure that the forms are populated correctly. The techniques and systems described herein can therefore provide improved importation of data and interoperability with third-party software, and can provide improved efficiency in use of such third-party software by bypassing manual form entry of data that is automatically imported and/or populated into the forms.

Various aspects of the application will be described with respect to the figures. FIG. 1 is a block diagram illustrating an architecture of a payment service environment 100. The payment service environment 100 may be referred to as a payment service system, a payment service platform, a payment platform, or a combination thereof. The payment service environment 100 includes one or more data sources 105, one or more analysis and transfer systems 115, and at least one user device 135. The payment service environment 100 and/or its sub-systems may each include server, a network, a payment application, a mobile device, another type of computing system described herein, or a combination thereof.

The data source(s) 105 provide information (e.g., dynamic information feeds) to the analysis and transfer system(s) 115, which can receive, parse, and analyze the dynamic information feeds. As described above, dynamic information feeds provide streams of information in real-time, for instance via social media feeds, news feeds, weather feeds, and the like. In some examples, the data source(s) 105 and/or the analysis and transfer system(s) 115 can parse the dynamic information to identify a topic, for example, based on a number of instances of a topic in a dynamic information feed, the number of instances of the topic satisfying a threshold, a frequency of the topic being mentioned in the dynamic information feed, a recency of the topic being mentioned in the dynamic information feed, and/or the like. In some examples, recency and/or frequency can be used to determine whether a topic is "trending."

Examples of dynamic information feeds are illustrated and include the dynamic information feed 110A, the dynamic information feed 110B, and the dynamic information feed 110C. The dynamic information feed 110A is a social media feed associated with a social media application and/or service, such as Twitter® or Facebook®. In an example, topics that the analysis and transfer system(s) 115 considers to be trending in the dynamic information feed 110A can be identified using hashtags or similar identifiers. For instance, in the dynamic information feed 110A, trending topics include #Ukraine, #JapanEarthquake, #Election, and #SaveTheOcean. In other examples, topics can be identified by parsing or otherwise analyzing individual messages, posts, images, content, or the like to identify recurring topics. For instance, in some examples, topics can include climate change, carbon footprint reduction, and the like.

The dynamic information feed 110B is a news feed associated with a news application and/or service. Topics that the analysis and transfer system(s) 115 considers to be trending in the dynamic information feed 110B are associated with news articles and/or headlines. In some examples, topics can be identified by parsing or otherwise analyzing individual news articles, headlines, images, content, or the like to identify recurring topics.

The dynamic information feed 110C is a user transaction history feed associated with a payment application and/or service. The dynamic information feed 110C indicates that the user has made various payments, including an online music service subscription, two meals at "Sushi Supreme," a purchase at a warehouse store, and a meal at "East European Deli." Recent and/or frequent purchases in the dynamic information feed 110C may be considered by the analysis and transfer system(s) 115 to be trending topics in the context of the dynamic information feed 110C. For instance, the analysis and transfer system(s) 115 can consider the "Sushi Supreme" to be trending in the dynamic information feed 110C based on the user recently purchasing multiple meals at "Sushi Supreme."

In some examples, trending topics from different dynamic information feeds can align. For instance, trending topic #JapanEarthquake from dynamic information feed 110A aligns with news headline "Earthquake rocks Japan" in dynamic information feed 110B, trending topic #Ukraine from dynamic information feed 110A aligns with news headline "Conflict in Ukraine Escalates" in dynamic information feed 110B, and trending topic #Election from dynamic information feed 110A aligns with news headline "Primary election polls close" in dynamic information feed 110B.

In some examples, certain transactions in the user transaction history feed of dynamic information feed 110C may be associated in some way with trending topics from other dynamic information feeds. For instance, if "Sushi Supreme" has identified as a Japanese restaurant, the analysis and transfer system(s) 115 may consider the purchases at "Sushi Supreme" to be related to the trending topic #JapanEarthquake from dynamic information feed 110A and the news headline "Earthquake rocks Japan" in dynamic information feed 110B. Similarly, because "East European Deli" is an Eastern European restaurant, the analysis and transfer system(s) 115 may consider the purchases at "East European Deli" to be related to the trending topic #Ukraine from dynamic information feed 110A and the news headline "Conflict in Ukraine Escalates" in dynamic information feed 110B.

In some examples, the data source(s) 105 can additionally or alternatively provide other types of dynamic information feeds to the analysis and transfer system(s) 115, such as dynamic information feeds listing songs played over time (e.g., by a user, a radio station, a DJ, a playlist, a venue, or a combination thereof), dynamic information feeds listing weather data over time, dynamic information feeds listing sensor information over time, dynamic information feeds listing traffic data over time, or combinations thereof.

The analysis and transfer system(s) 115 can receive, parse, convert, normalize, format, and/or analyze the dynamic information feeds (e.g., dynamic information feeds 110A-110C) to determine trending causes as part of a discovery process. Trending causes may refer to trending topics that are related to issues occurring in the world or in a specific region, and/or relief efforts for such issues, such as natural disasters, social issues, climate issues, political issues, labor issues, other types of issues discussed herein, or combinations thereof. In some examples, the analysis and transfer system(s) 115 can parse the dynamic information feeds (e.g., dynamic information feeds 110A-110C) using natural language processing to identify the trending causes. In some examples, the analysis and transfer system(s) 115 can parse the dynamic information feeds (e.g., dynamic information feeds 110A-110C) using one or more trained machine learning (ML) models 130 to identify the trending causes, for instance based on input of the dynamic information feeds into the trained ML model(s) 130. In some examples, the trained ML model(s) 130 can be trained to identify trending causes from the dynamic information feeds using training data. The training data may include dynamic information feeds as well as specified trending causes previously identified from the dynamic information feeds.

In some examples, the parsing and/or analysis by the analysis and transfer system(s) 115 may include natural language analysis of text and/or speech from the dynamic information feeds using natural language model(s). In some examples, the parsing and/or analysis by the analysis and transfer system(s) 115 may include optical character recognition (OCR) to identify character(s) (e.g., text and/or numbers, in some cases in a string) depicted or otherwise represented in image data in the dynamic information feeds. In some examples, the parsing and/or analysis by the analysis and transfer system(s) 115 may include speech-to-text analysis to extract text-based data from content (e.g., audio clip(s) and/or video clip(s)) in the dynamic information feeds. In some examples, the parsing and/or analysis by the analysis and transfer system(s) 115 may include image processing of image(s) and/or video(s) in the dynamic information feeds, for instance to performs feature extraction, feature detection, feature recognition, feature tracking, object detection, object recognition, object tracking, person detection, person recognition, person tracking, facial detection, facial recognition, facial tracking, vehicle detection, vehicle recognition, vehicle tracking, animal detection, animal recognition, animal tracking, classification, or a combination thereof.

In an example, after the analysis and transfer system(s) 115 identifies the trending causes in the dynamic information feeds (e.g., dynamic information feeds 110A-110C), the analysis and transfer system(s) 115 identifies, from the set of trending causes, at least one trending cause that is relevant to the user 145 and/or the user device 135. This may be another part of the discovery process. The analysis and transfer system(s) 115 can access user data from a user data data store (DS) 120 of the analysis and transfer system(s) 115. The user data DS 120 and the distribution DS 160 can each include a database, a table, a heap, a tree, a distributed ledger, a blockchain ledger, any other data structure described herein, or a combination thereof. The user data DS 120 includes user data about the user 145 and/or the user device 135. For instance, in some examples, the user data DS 120 includes user profiles for users, as in the user profile 125 for example user "John Smith." User profile can include demographic information (e.g., name, age, sex, gender, date of birth, birthplace, ethnic background, address, phone number, other contact information), user preferences (explicitly provided or implicitly determined), identification of friends or family of the user or other connections of the user (explicitly provided or implicitly determined), identification of products and/or services bought, sold, traded, obtained, owned, etc. by the user, causes the user cares about, has interest in, or otherwise supports (explicitly provided or implicitly determined), or combinations thereof. For instance, the user profile 125 indicates that user John Smith is male, aged 30, his favorite food is sushi, his background is Ukrainian, and his friends include Jane.

In some examples, the user data DS 120 can include dynamic information feed(s) related to activities and/or attributes of the user, such as the dynamic information feed 110C with the user transaction history, a user purchase history, a user donation history, a user location history, a user music play history, a user video play history, a user residence history, a user relationship history, a user social media history, a user preference history, and the like. In some examples, certain dynamic information feed(s) related to user(s) may appear in the data source(s) 105, the user data DS 120, or both. In some examples, there may be overlap between the data source(s) 105 and the user data DS 120, for instance with one or more computing systems and/or data storage systems shared between the data source(s) 105 and the user data DS 120.

The analysis and transfer system(s) 115 compares the trending causes identified from the dynamic information feed(s) (e.g., dynamic information feeds 110A-110C) with the user information (e.g., from the user data DS 120 and/or dynamic information feed(s) associated with user activities/attributes) to identify the at least one trending cause that is relevant to the user 145 and/or the user device 135. In some examples, the analysis and transfer system(s) 115 can compare the trending causes with the user information using natural language processing to identify the at least one trending cause that is relevant to the user 145 and/or the user device 135. In some examples, the analysis and transfer system(s) 115 can input the trending causes (and/or the dynamic information feeds) and the user information into the trained ML model(s) 130 to identify the at least one trending cause that is relevant to the user 145 and/or the user device 135. In some examples, the trained ML model(s) 130 can be trained to identify the at least one trending cause that is relevant to the user 145 and/or the user device 135 using training data. The training data may include a list of trending causes, user information, and specified trending cause(s) previously identified as relevant to user(s) that the user information describes.

Once the analysis and transfer system(s) 115 identifies the at least one trending cause that is relevant to the user 145 and/or the user device 135 through the discovery process, the analysis and transfer system(s) 115 can determine when to surface a recommendation for the trending cause that is relevant to the user 145 and/or the user device 135 to the user device 135 (e.g., and thus to the user 145). In some examples, the analysis and transfer system(s) 115 can surface the recommendation as a recommendation alert 155 immediately upon identifying the at least one trending cause that is relevant to the user 145 and/or the user device 135 through the discovery process.

In some examples, the analysis and transfer system(s) 115 may wait to surface the at least one trending cause that is relevant to the user 145 and/or the user device 135 until a certain trigger condition is met. Examples of trigger conditions can include conditions under which the cause is relevant to an activity or location or person associated with the user 145, conditions under which the user 145 is approving another asset transfer (e.g., a purchase from a merchant) and may be amenable to approving the transfer for the cause as well, and the like. For instance, trigger conditions can include conditions in which the user 145 is checking out at a POS terminal of a merchant who is associated with the relevant cause, conditions in which the user 145 is listening to a song by an artist who associated with the relevant cause, conditions in which the user 145 is sending or receiving a P2P payment to or from a second user who is connected to the relevant cause, conditions in which the user 145 is reading or viewing (e.g., via the user device 135) an article or social media post or message or image or video that is about the relevant cause, conditions in which the user 145 is reading or viewing (e.g., via the user device 135) an article or social media post or message or image or video by an author who is connected to the relevant cause, conditions in which the user 145 is has written or created or captured or posted (e.g., via the user device 135) an article or social media post or message or image or video that is about the relevant cause, conditions in which the user 145 has entered or is otherwise within a location or area that is associated with the relevant cause, conditions in which the user device 135 has interacted with an interactive element (e.g., a quick response (QR) code or near field communication (NFC) tag) that is associated with the relevant cause, various other surfacing trigger conditions illustrated or described herein, a new element (e.g., article or social media post or message or image or video) appears in a dynamic data feed, the presentation of a "year in review" or other review analysis relating to the cause, or a combination thereof. The occurrence and/or meeting of such trigger conditions can be identified, detected, and/or verified using the user device 135, the analysis and transfer system(s) 115, the data source(s) 105, the local application 140, a payment application 142, or a combination thereof, as a part of the surfacing process.

In an example, the analysis and transfer system(s) 115 generates a recommendation alert 155 identifying the at least one trending cause that is relevant to the user 145 and/or the user device 135. In response to detection that a trigger condition is met (as discussed above) analysis and transfer system(s) 115 can format the recommendation alert 155 based on a formatting scheme for an interface of a local application 140 that is stored locally on the user device 135, and that can be run by the processor(s) of the user device 135 to display or otherwise output the interface of the user device 135. The local application 140 can be any type of application, with various examples of various types of local applications illustrated in FIGS. 1-6. The local application 140 can be relevant to the trigger condition, for instance occurring within the local application 140. For example, if the trigger condition for surfacing the recommendation alert 155 is reading a news article about the relevant cause in a news reader application, then the local application 140 can be the news reader application. In FIG. 1, the local application 140 is illustrated as being a payment application showing a receipt for a purchase 150 of veggie rolls and salad at merchant "Sushi Supreme." The analysis and transfer system(s) 115 sends the recommendation alert 155 to the user device 135 in response to detecting that a trigger condition is met, since merchant "Sushi Supreme" is a Japanese restaurant and is therefore relevant to the trending cause $JapanEarthquake that the analysis and transfer system(s) 115 determined (during the discovery process) to be relevant to the user 145 and/or the user device 135. The analysis and transfer system(s) 115 sending the recommendation alert 155 to the user device 135 causes the user device 135 to surface (e.g., output and/or display) the recommendation alert 155 within the interface of the local application 140. Thus, the local application 140, via the recommendation alert 155, includes a recommendation, to the user 145, the at least one trending cause that is relevant to the user 145 and/or the user device 135. The recommendation alert 155 is illustrated in FIG. 1 as recommending a $5 donation to the $JapanEarthquake trending cause, which the analysis and transfer system(s) 115 determined is relevant to the user 145, for instance because the user profile 125 indicates sushi (a Japanese food) as a favorite food, the dynamic information feed 110C indicates "Sushi Supreme" (a Japanese restaurant) as a trending purchase in the user's purchase history, and/or because the purchase 150 itself is from "Sushi Supreme."

In addition to, or as an alternative of, a purchase 150 between a customer and a merchant, the analysis and transfer system(s) 115 can provide a recommendation alert 155 to be surfaced in a peer-to-peer (P2P) payment interface. The recommendation alert 155 to be surfaced in the P2P payment interface also based on a trigger condition, such as where the other user in the P2P payment is associated with the relevant cause, where the other user in the P2P payment has recently (e.g., within a threshold amount of time) donated or otherwise transferred asset(s) to the relevant cause, where the other user in the P2P payment meets another one of the types of trigger conditions listed above, or a combination thereof. The recommendation alert 155 to be surfaced in the P2P payment interface can be surfaced before, during, or after the user 145 reviewing (e.g., to approve or deny) a transfer of the P2P payment. In some examples, the amount of asset(s) that the recommendation alert 155 recommends transferring to the cause (e.g., in FIG. 1, $5) can be based on a certain predetermined proportion (e.g., 5%, 10%, 15%, and the like) of a transaction (e.g., the merchant-customer transaction illustrated in FIG. 1 or the P2P transaction discussed above). In some examples, the amount of asset(s) that the recommendation alert 155 recommends transferring to the cause can be based on a how much other users have, on average, transferred to the relevant cause and/or to other causes. In some examples, the amount of asset(s) that the recommendation alert 155 recommends transferring to the cause can be based on a how much the user 145 has, in the past, transferred to the relevant cause and/or to other causes. In some examples, the amount of asset(s) that the recommendation alert 155 recommends transferring to the cause can be predetermined. In some examples, a cause is a type of topic, or vice versa. In some examples, a trending cause is a type of trending topic, or vice versa.

As indicated above, the local application 140 may in some examples be a payment application 142, for instance for customer-merchant transaction, P2P transactions, or a combination thereof. In some cases, the local application 140 may be a different type of application that may nonetheless interact with a payment application 142. For instance, the local application 140 may use an application programming interface (API) of the payment application 142 to call certain functions of the payment application 142. Similarly, the payment application 142 may use its API, and/or an API of the local application 140, to push content (e.g., the recommendation alert 155) into the local application 140 to surface the content (e.g., the recommendation alert 155) within the local application 140. The payment application 142 may be associated with the analysis and transfer system(s) 115. For instance, in situations where the local application 140 is not the payment application 142 (e.g., where the local application 140 is a news reader application, a social media application, a music or video player application, and the like), the local application 140 may communicate using the API(s) with the payment application 142 (and therefore the analysis and transfer system(s) 115) to provide contextual information about what the local application 140 is outputting to the user 145 and/or how the user 145 is interacting with the local application 140. The payment application 142 (and therefore the analysis and transfer system(s) 115) can add this contextual information to the user data DS 120 for discovery, and/or can use this contextual information to determine if a trigger condition for surfacing the recommendation alert 155 within the local application 140 has occurred. For instance, the local application 140 can share contextual information with the payment application 142 (and therefore the analysis and transfer system(s) 115) via the API(s) to indicate that the local application 140 is showing the user 145 an article about the Japan Earthquake, and/or that the user 145 is interacting with the article (e.g., liking the article, sharing the article, commenting on the article, and the like). This contextual information may be used by the payment application 142 (and therefore the analysis and transfer system(s) 115) as a trigger condition for surfacing the recommendation alert 155 about the $JapanEarthquake relevant cause to the user device 135 through the local app 140 via the API(s), for instance causing the recommendation alert 155 to be output at the user device 135 within the local application 140 below, above, beside, or within the content of the article.

The analysis and transfer system(s) 115 includes a "yes" button and a "no" button, which could alternatively be any type of user interface element that, in some examples, can be interactable. The user 145 can press via an interaction with a touch user interface or other user input the yes button to cause the analysis and transfer system(s) 115 to facilitate and/or process a transfer of at least one asset (e.g., funds, fiat currencies, security assets such as stocks or bonds, cryptocurrencies, non-fungible tokens (NFTs), or combinations thereof) from at least one account of the user (e.g., a credit account, a debit account, a savings account, a checking account, a retirement account, a cryptocurrency wallet, a stock portfolio, a bond portfolio, or a combination thereof) to at least one account (e.g., a credit account, a debit account, a savings account, a checking account, a retirement account, a cryptocurrency wallet, a stock portfolio, a bond portfolio, or a combination thereof) of at least one recipient entity (e.g., a charity, a business, a non-profit organization, a governmental entity, another type of organization, a union, a person, a group of people, or a combination thereof) according to a specified distribution. In some examples, the asset can be transferred to a holding account, for example, of the analysis and transfer system(s) 115, prior to be transferred to an account of the recipient entity(s).

In some examples, the specified distribution may be one of a set of distributions 165 identified in the distribution DS 160. For instance, the distributions 165 identified in the distribution DS 160 indicate that donations to the $JapanEarthquake trending cause are to be donated in 60% to the International Red Cross, in 30% to Second Harvest Japan, and in 20% to Doctors Without Borders. The distributions 165 identified in the distribution DS 160 indicate that donations to the $SaveTheOcean trending cause are to be donated in 40% to the Save The Whales, in 30% to the Dolphin Project, and in 20% to Oceanic Preservation Society. In some examples, the analysis and transfer system(s) 115 can determine a distribution. For instance, in some examples, the analysis and transfer system(s) 115 can determine the recipient entities, and/or the distribution thereto, based on recipient entities that have been donated to for similar events in the past (e.g., for $JapanEarthquake, other earthquakes, other natural disasters, other events in Japan, and the like). In some examples, the analysis and transfer system(s) 115 can determine the recipient entities, and/or the distribution thereto, using the trained ML model(s) 130 that may be trained based on training data identifying past causes and past distributions for those causes.

In some examples, the analysis and transfer system(s) 115 may generate an identifier for a trending cause after identifying the trending cause from the dynamic information feeds. Example identifiers for trending causes are illustrated herein with a "$" symbol in front, for instance using "$JapanEarthquake," "$SaveTheOcean," "$Ukraine," and the like. That is, in some examples, trending causes can be identified by a particular syntax having a dollar, or other currency, symbol that precedes one or more alphanumeric characters. Of course, the particular syntax can use an alternative symbol (e.g., a hashtag (#), an "at" (@) symbol, or the like).

In some examples, the analysis and transfer system(s) 115 can determine the distribution for a particular trending cause immediately after identifying the trending cause during the discovery process, and can generate a record in the distribution DS 160 with the identifier along with the corresponding distribution. In some examples, the analysis and transfer system(s) 115 can determine the distribution for a particular trending cause some time after identifying the trending cause during the discovery process. For instance, for a cause associated with a sudden event such as an earthquake or other natural disaster, it may take some time for the analysis and transfer system(s) 115 (and/or operator(s) thereof) to identify the optimal recipient entities to donate fund(s) and/or other asset(s) to for that cause, and/or how the distribution(s) of how those fund(s) and/or other assets should optimally be distributed between the recipient entities. In such cases, the analysis and transfer system(s) 115 generates a record in the distribution DS 160 with the identifier. Donations or other transfer(s) received for that trending cause can be held in a holding account by the analysis and transfer system(s) 115, at least until the analysis and transfer system(s) 115 determines the distribution of recipient entities corresponding to that trending cause. Once the analysis and transfer system(s) 115 determines the distribution of recipient entities corresponding to that trending cause, the analysis and transfer system(s) 115 updates the record corresponding to the identifier in the distribution DS 160.

When the analysis and transfer system(s) 115 facilitates a transfer based on the recommendation alert 155, the analysis and transfer system(s) 115 can query the distribution DS 160 for the identifier of the trending cause that is recommended in the recommendation alert 155, and can automatically facilitate the transfer of the funds or other assets to the recipient entities according to the distribution. In some examples, the analysis and transfer system(s) 115 can update the distribution corresponding to a given trending cause, for instance based on new developments in the dynamic information feed(s). That is, the analysis and transfer system(s) 115 can generate or modify the distribution based in real-time or near real-time. For instance, for the $JapanEarthquake trending cause, if the analysis and transfer system(s) 115 determines based on the dynamic information feed 110B that a particular structure was damaged, the analysis and transfer system(s) 115 may add, as a recipient entity in the corresponding distribution, an entity associated with rebuilding or repairing that structure (or that type of structure).

While the recommendation alert 155 illustrated in FIG. 1 is for a donation, it should be understood that the analysis and transfer system(s) 115 may generate a recommendation alert for any type of asset transfer associated with a trending cause that is relevant to the user. For instance, the analysis and transfer system(s) 115 may generate a recommendation alert for a donation to an entity associated with the trending cause that is relevant to the user, a tip for the entity, a purchase from the entity, an investment in the entity, or a combination thereof. A donation can be provided to one or more entities as described above with respect to the distributions 165 of FIG. 1. In some cases, the dynamic information feed(s) and/or user data DS 120 can include data specific to the user 145, for instance identifying services that the user has received and/or purchased. The recommendation alert 155 can recommend that the user 145 pay tips to those service providers, for instance surfaced based on a trigger condition indicating that the user has received another service. In some cases, rather than a donation to an entity associated with the relevant cause, the recommendation alert 155 can identify a merchant, a product, and/or a service that is associated with the relevant cause that the user 145 can purchase. For instance, the merchant can indicate that proceeds from such a purchase will go towards the cause, a product can be associated with the cause (e.g., an apparel item with a slogan promoting the cause, created by someone associated with the cause, or may otherwise support the cause), the merchant themselves can be associated with that cause, and the like. In some examples, in lieu of making a donation or a purchase, techniques described herein can enable a user to purchase an asset, such as stock in a company associated with the cause. In some examples, actions can be recommended that are unrelated to financial transactions, such as causing an action to be performed in furtherance of the cause (e.g., causing trees to be planted to offset carbon footprint or shoes to be purchased for children needing shoes) or downloading or accessing a playlist associated with a cause or a podcast about the cause.

In some examples, acceptance of a recommendation can initiate a one-time action, a recurring action, a scheduled action, or the like. For example, a user can accept a recommendation for making a one-time donation, a recurring donation, a scheduled donation, or the like.

In some examples, the user device 135 may be a user's mobile device that the user 145 is directly interacting with. In some examples, the user device 135 may be a self-checkout POS terminal. In some examples, the user device 135 may be a POS terminal of a merchant, where the user 145 is either the merchant or the customer. In some examples, if the user 145 is a customer, the user 145 may interact with the user device 135 indirectly, by interacting with the merchant who directly interacts with the POS terminal. The if the user 145 is a merchant, the user 145 can more directly interact with the POS terminal. In some examples, even if the user 145 is a customer, the user 145 can interact with the POS terminal directly for certain operations (e.g., providing a signature, a PIN code, a selection regarding a recommendation alert 155, and the like). The recommendation alert 155 may therefore be presented to the user 145, or to an intermediary (e.g., the merchant) who can then present the recommendation alert 155 as an option to the user 145 (e.g., through a verbal question or a prompt at a user terminal associated with the POS terminal). In some examples, the recommendation alert 155 can concern a merchant-customer transaction between a customer and a merchant. In some examples, the recommendation alert 155 can concern a peer-to-peer (P2P) transaction between a first user and a second user. In some examples, the analysis and transfer system(s) 115 and/or the user device 135 can choose to surface the recommendation alert 155 at a particular time at the user device 135 based on context. For instance, the recommendation alert 155 can be surfaced while a user 145 (e.g., a merchant or customer) is inputting purchase(s) into a user device 135 (e.g., a POS terminal), while the user device 135 is showing a receipt or purchase tabulation for approval, any other trigger condition described herein, or a combination thereof.

Figure 2:
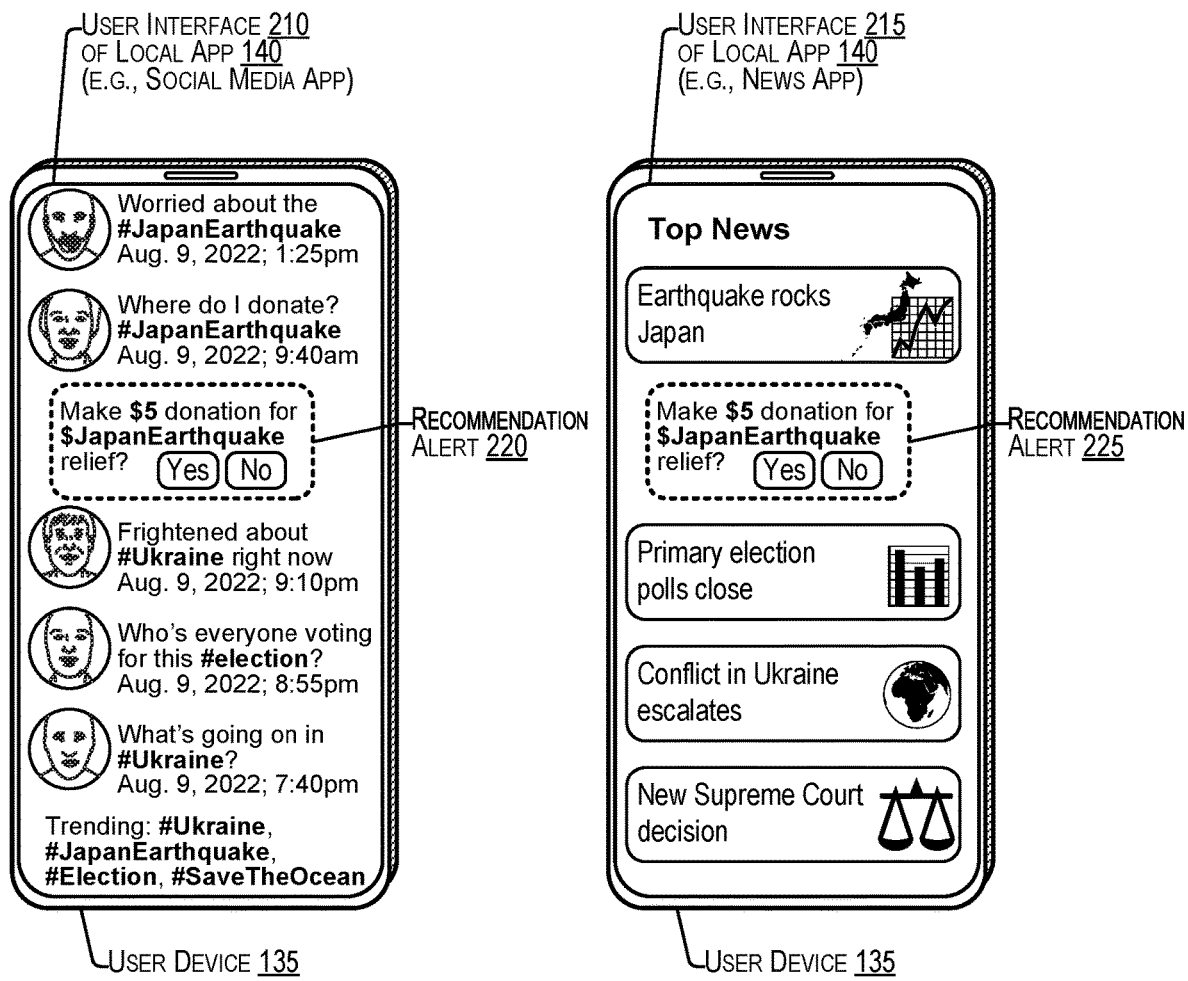
FIG. 2 is a conceptual diagram illustrating examples of user interfaces surfacing recommendation alerts within the context of examples of local applications (e.g., social media and news) running on a user device, in accordance with some examples.

FIG. 2 is a conceptual diagram 200 illustrating examples of user interfaces 210-215 surfacing recommendation alerts 220-225 within the context of examples of local applications 140 (e.g., social media and news) running on a user device 135. For instance, the user interface 210 illustrates local application 140 that is a social media application, such as Twitter® or Facebook®, with posts by numerous users. The analysis and transfer system(s) 115 generates the recommendation alert 220 recommending a donation to the $JapanEarthquake trending cause, and formats the recommendation alert 220 to match the interface of the social media application by inserting the recommendation alert 220 adjacent to a set of multiple user posts about the #JapanEarthquake trending topic.

Similarly, the user interface 215 illustrates local application 140 that is a news application, with news headlines for various news stories. The analysis and transfer system(s) 115 generates the recommendation alert 225 recommending a donation to the $JapanEarthquake trending cause, and formats the recommendation alert 225 to match the interface of the social media application by inserting the recommendation alert 225 adjacent to a news headline reading "Earthquake rocks Japan" about the same trending cause.

Figure 3:
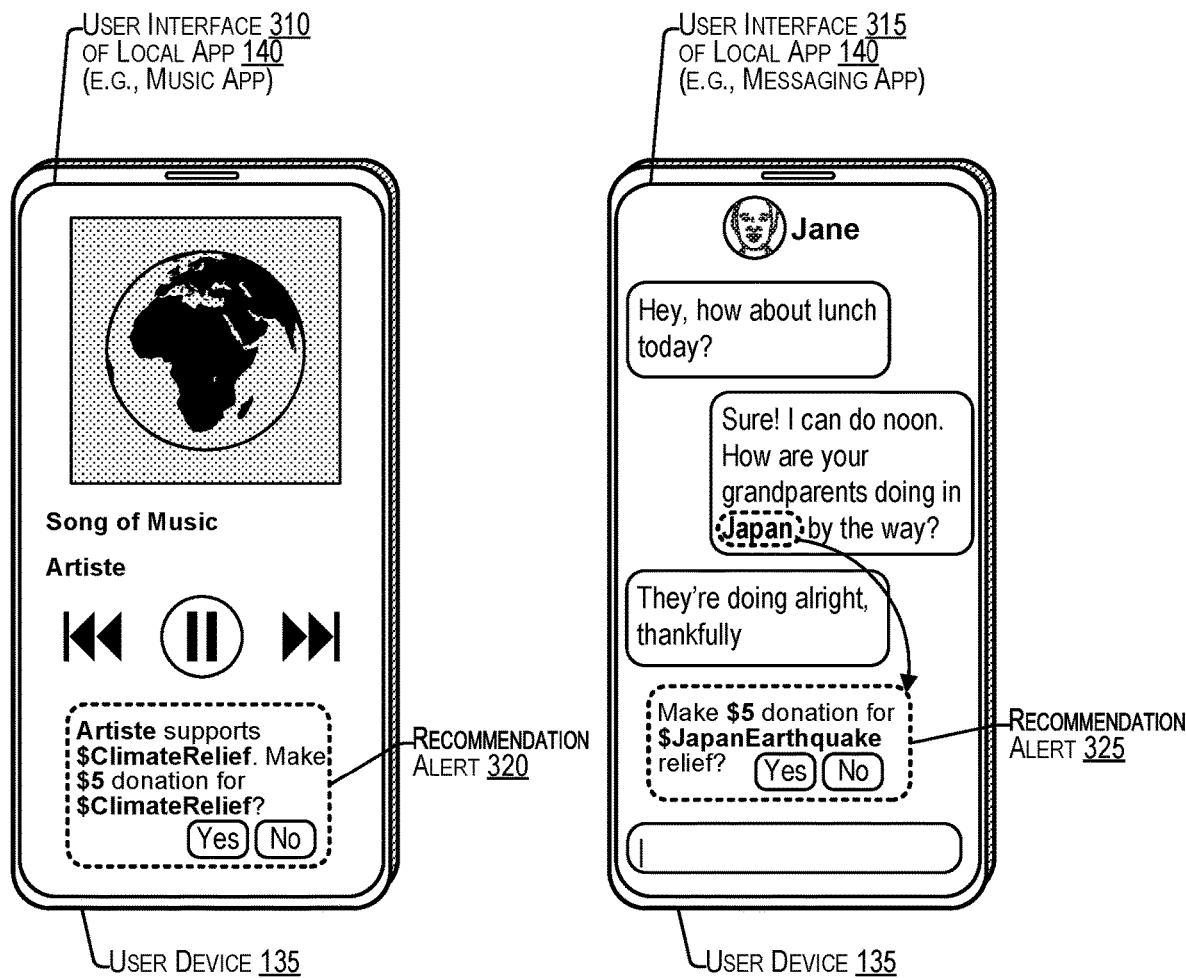
FIG. 3 is a conceptual diagram illustrating examples of user interfaces surfacing recommendation alerts within the context of examples of local applications (e.g., music and messaging) running on a user device, in accordance with some examples.

FIG. 3 is a conceptual diagram 300 illustrating examples of user interfaces 310-315 surfacing recommendation alerts 320-325 within the context of examples of local applications 140 (e.g., music and messaging) running on a user device 135. For instance, the user interface 310 illustrates local application 140 that is a music player application, such as Tidal®, playing a song titled "Song of Music" by artist "Artiste." The analysis and transfer system(s) 115 generates the recommendation alert 320 recommending a donation to the $ClimateRelief trending cause, and formats the recommendation alert 320 to match the interface of the music application by inserting the recommendation alert 320 adjacent to information about the music that is currently playing, and the controls for playing the music. The recommendation alert 320 indicates that the artist "Artiste" supports the $ClimateRelief trending cause, and requests that the user donate to the $ClimateRelief trending cause. The playback of music by the artiste "Artiste" may be identified in the user's user information, hence the support by the artist "Artiste" for the $ClimateRelief trending cause may be considered user information that causes the analysis and transfer system(s) 115 to recommend the $ClimateRelief trending cause to the user.

The user interface 315 illustrates local application 140 that is a messaging application, with a conversation between two users. The analysis and transfer system(s) 115 generates the recommendation alert 325 recommending a donation to the $JapanEarthquake trending cause, and formats the recommendation alert 325 to match the interface of the messaging application by visually linking the recommendation alert 325 to a message that includes a mention of one of the users' grandparents in Japan. The contents of these messages may be considered user information, and may be used analysis and transfer system(s) 115 to recommend the $JapanEarthquake trending cause to the user.

Figure 4:
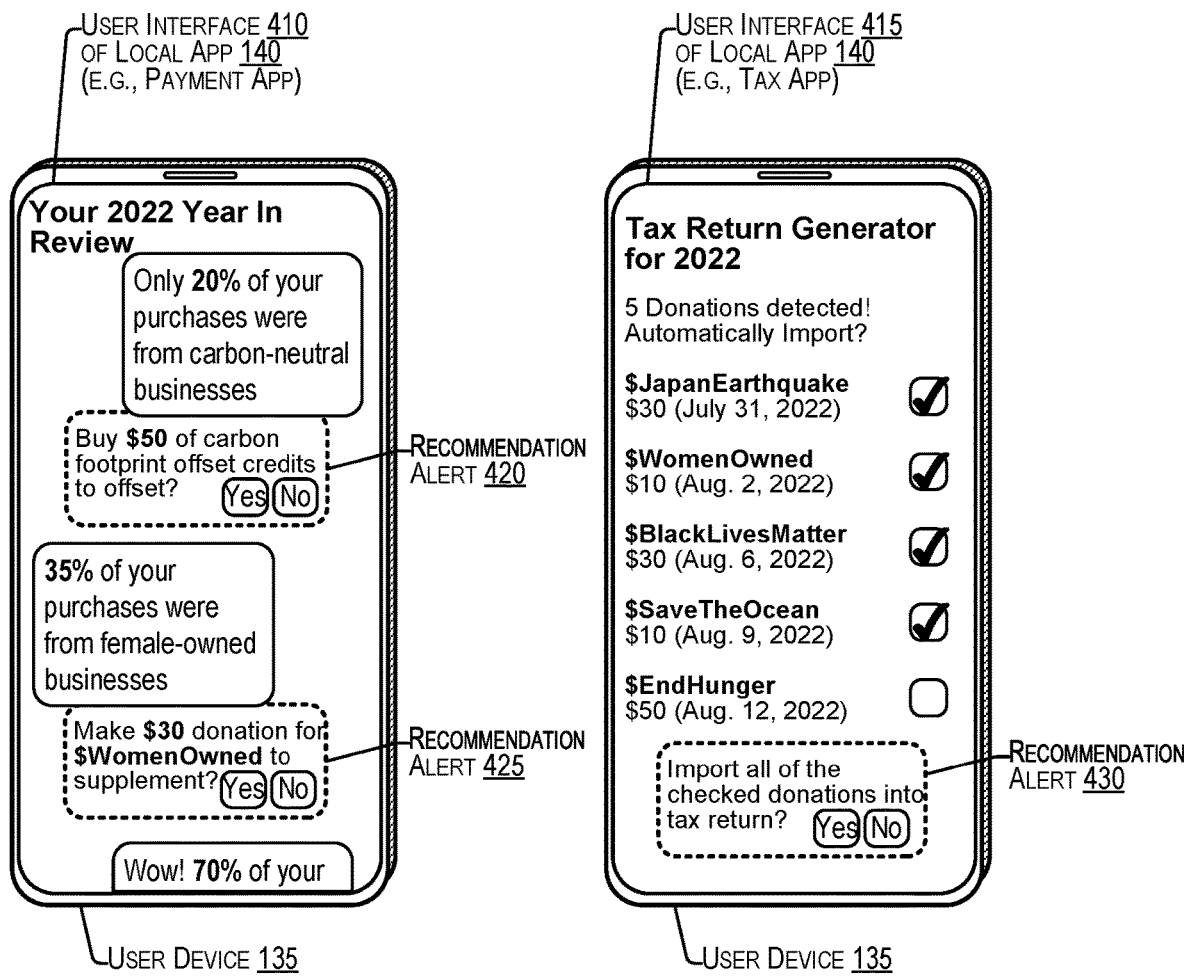
FIG. 4 is a conceptual diagram illustrating examples of user interfaces surfacing recommendation alerts within the context of examples of local applications (e.g., payment and tax) running on a user device, in accordance with some examples.

FIG. 4 is a conceptual diagram 400 illustrating examples of user interfaces 410-415 surfacing recommendation alerts 420-430 within the context of examples of local applications 140 (e.g., payment and tax) running on a user device 135. For instance, the user interface 410 illustrates local application 140 that is a payment application with a "Your 2022 Year In Review" interface with statistics summarizing the types of purchases and other transactions that the user made during the year 2022. The "Your 2022 Year In Review" interface identifies that only 20% of the user's purchases in 2022 were from carbon-neutral businesses, a statistic that may be treated as user information by the analysis and transfer system(s) 115 to generate the recommendation alert 420 recommending a purchase of $50 of carbon footprint offset credits to help offset this statistic. The analysis and transfer system(s) 115 may consider climate change to be a trending cause, and may have a "$" identifier (e.g., $Climatechange) despite the omission of the identifier from the recommendation alert 420. The "Your 2022 Year In Review" interface identifies that 35% of the user's purchases in 2022 were from female-owned businesses, a statistic that may be treated as user information by the analysis and transfer system(s) 115 to generate the recommendation alert 425 recommending a donation to the $WomanOwned trending cause.

The user interface 415 illustrates local application 140 that is a tax return preparation application. The illustrated interface of the tax return preparation application identifies 5 donations made during the year 2022, including donations to trending causes $JapanEarthquake, $WomanOwned, $BlackLivesMatter, $SaveTheOcean, and $EndHunger. Each of these donations includes a respective checkbox, with all of the checkboxes checked except for the checkbox corresponding to the donation to $EndHunger. The analysis and transfer system(s) 115 generates the recommendation alert 430 recommending transfer of the donations for which boxes are checked into the user's tax return. In some examples, donations and/or purchases made based on any recommendation alerts described herein may be automatically imported into the forthcoming year's tax returns when the donation or purchase is made, rather than after the fact.

Figure 5:
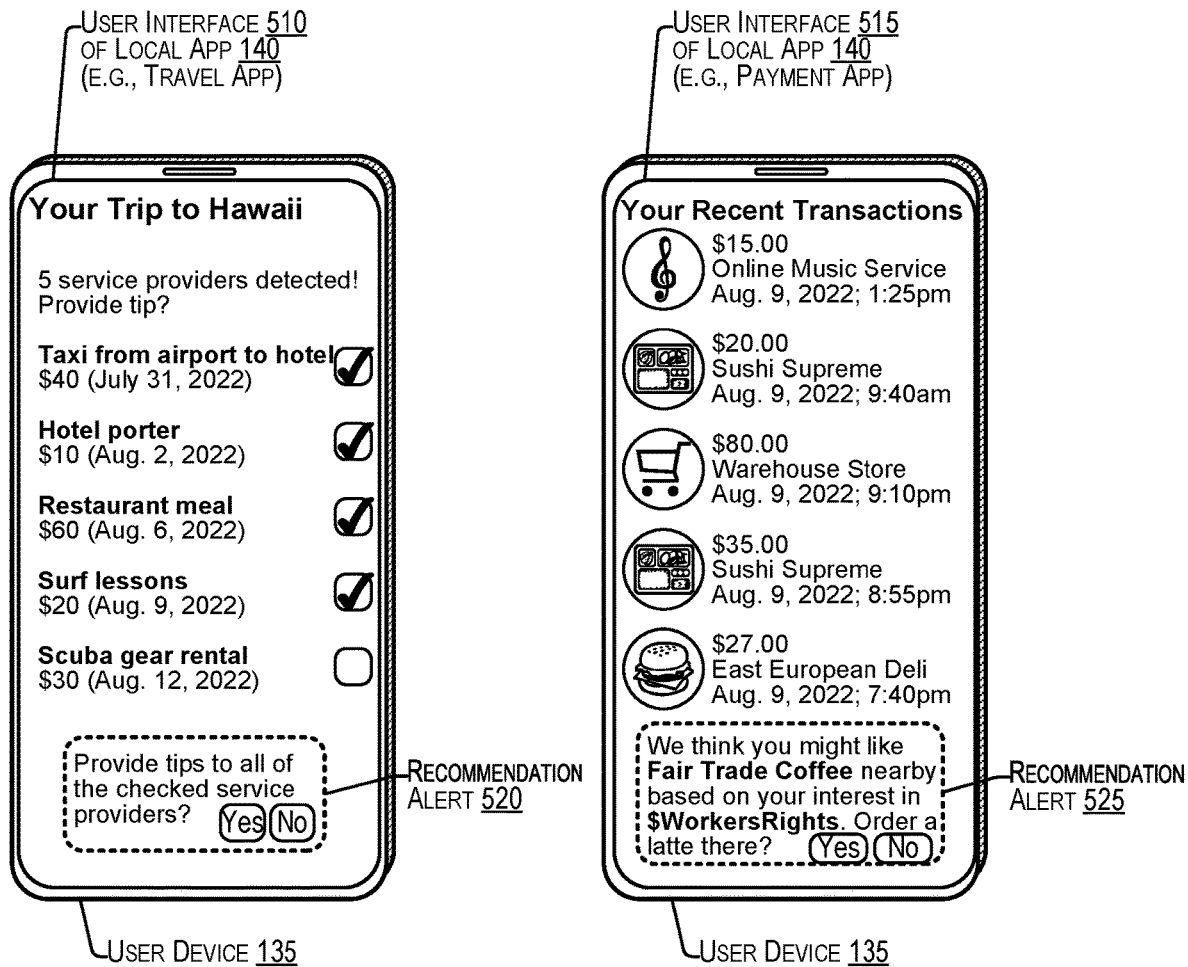
FIG. 5 is a conceptual diagram illustrating examples of user interfaces surfacing recommendation alerts within the context of examples of local applications (e.g., travel and payment) running on a user device, in accordance with some examples.

FIG. 5 is a conceptual diagram 500 illustrating examples of user interfaces 510-515 surfacing recommendation alerts 520-525 within the context of examples of local applications 140 (e.g., travel and payment) running on a user device 135. For instance, the user interface 510 illustrates local application 140 that is a travel application. The illustrated interface of the travel application identifies five transactions made with various service providers during a Hawaii trip, including a payment for a taxi from the airport to the hotel, a hotel porter, a restaurant meal, surf lessons, and a scuba gear rental. Each of these transactions includes a respective checkbox, with all of the checkboxes checked except for the checkbox corresponding to the scuba gear rental. The analysis and transfer system(s) 115 generates the recommendation alert 520 recommending to provide tips for each of the service providers for which boxes are checked in the travel application interface. For instance, the tips may be sent to the taxi driver, the hotel porter, the restaurant wait staff, and the surf instructor. In the context of the travel application, the dynamic information feed(s) and user information used by the analysis and transfer system(s) 115 to generate the recommendation alert 520 may include a user transaction history. The service providers may be tipped using an asset transfer discussed herein. That is, an amount of an asset can be withdrawn from an account of the user and distributed among account(s) of the service providers. In some examples, this can be accomplished by a ledger adjustment to one or more ledgers tracking assets of users. In some examples, this can be accomplished via an account-to-account transfer or the like. The tips may be determined automatically based on predetermined proportions (e.g., 15%, 18%, 20%, 22%, 25%) of a purchase amount, based on past user tipping amounts, based on tipping amounts by other users, based on user inputs, or a combination thereof.

The user interface 515 illustrates local application 140 that is a payment application. The illustrated user transaction history interface of the payment application identifies 5 recent transactions, including an online music service subscription, two meals at "Sushi Supreme," a purchase at a warehouse store, and a meal at "East European Deli." The analysis and transfer system(s) 115 generates the recommendation alert 530 recommending that the user order a latte from business "Fair Trade Coffee" based on a trending cause that the analysis and transfer system(s) 115 determines relevant to the user, specifically $WorkersRights. That is, based at least in part on identifying a topic that is relevant to the user (e.g., $WorkersRights), the analysis and transfer system(s) 115 can identify one or more merchants and/or items that are associated with the topic. In some examples, such merchant(s) and/or item(s) can be identified using geolocation data, inventory data, merchant websites, advertisements, transaction data, specified merchant preferences, and/or the like.

Figure 6:
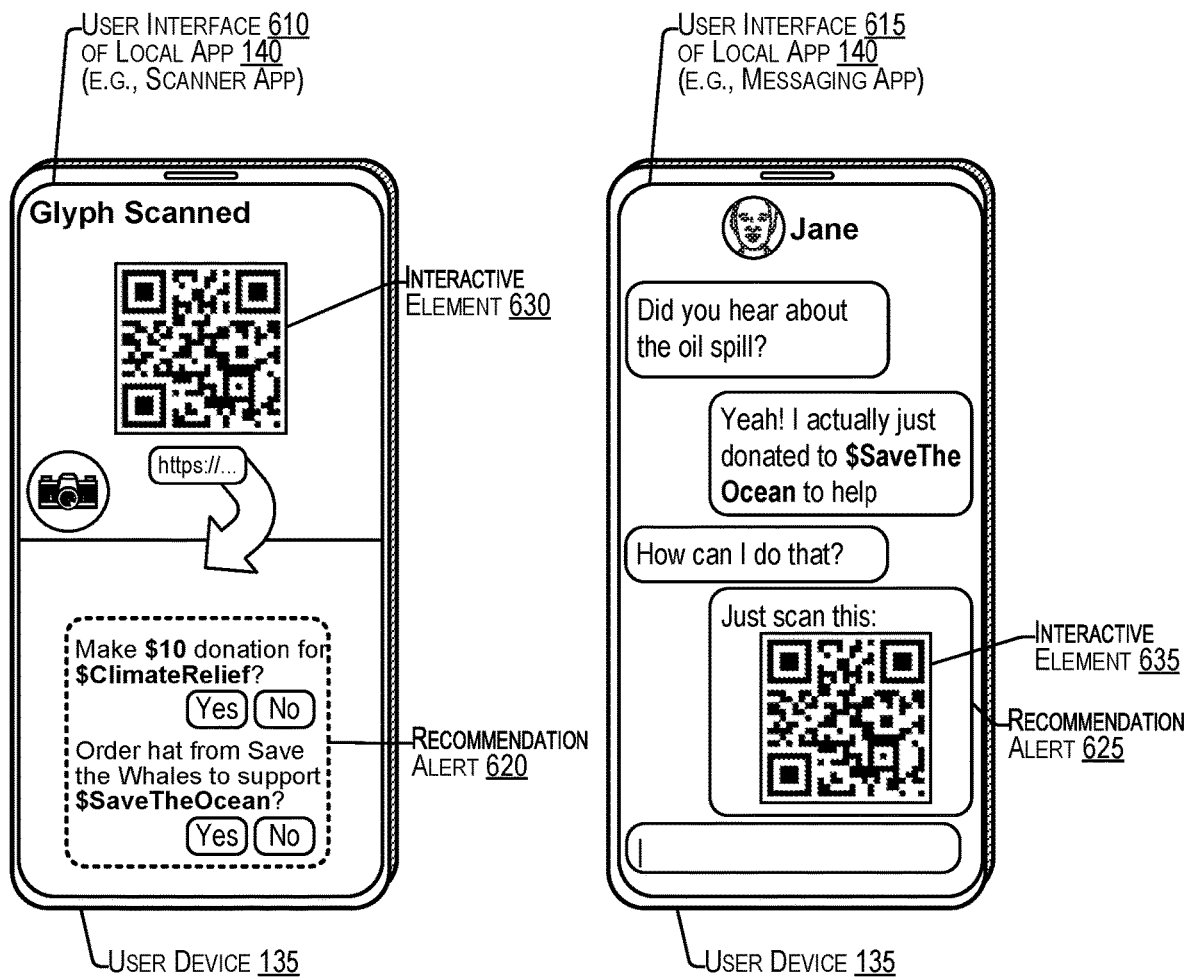
FIG. 6 is a conceptual diagram illustrating examples of user interfaces surfacing recommendation alerts using an interactive element, in accordance with some examples.

FIG. 6 is a conceptual diagram 600 illustrating examples of user interfaces 610-615 surfacing recommendation alerts 620-625 using an interactive element 630-635. For instance, the user interface 610 illustrates local application 140 that is a scanner application, or a camera application. The illustrated interface of the scanner application identifies and scans an interactive element 630, which is illustrated as a quick response (QR) code. The scanner application accesses data encoded in the interactive element 630 (e.g., in the QR code) to access an interface (e.g., a webpage, an app clip, or a combination thereof) with the recommendation alert 620. The analysis and transfer system(s) 115 generates the recommendation alert 620 recommending to make a $10 donation to the $ClimateRelief trending cause, and recommending to order a hat from the Save the Whales organization to support the $SaveTheOcean trending cause.

The user interface 615 illustrates local application 140 that is a messaging application with a conversation between two users. The analysis and transfer system(s) 115 generates the recommendation alert 625 with an interactive element 635 that, when scanned by another user (e.g., the other user in the messaging conversation), leads to a recommendation to donate to the $SaveTheOcean trending cause.

In some examples, the analysis and transfer system(s) 115 may generate an interactive element (e.g., interactive elements 630-635) corresponding to a particular recommendation alert (e.g., recommendation alerts 620-625) to make the recommendation alert(s) easier to share between users and/or user devices, to be able to provide the recommendation alert(s) to the user in a printed form (e.g., on a printed receipt or bill), or some combination thereof. In some examples, the interactive element can include an optical glyph, such as a QR code, a bar code, a data matrix, an Aztec code, Maxicode, a CodaBlock-F code, a Maxicode, a MicroPDF417 code, a PDF417 code, a Han Xin code, a DotCode, a snaptag, a color variant of any of the previously-listed glyph types (increasing storage capacity by using color as an additional dimension), or a combination thereof. The optical glyph can optically encode a recommendation alert (e.g., recommendation alerts 620-625) or a pointer (e.g., a uniform resource locator (URL) or uniform resource identifier (URI)) pointing to a location (e.g., a network location or an interface of the local application 140) of the recommendation alert. In some examples, the user 145 and/or user device 135 may receive an interactive element from another user, may encounter an interactive element on a receipt that is at least partially generated by the analysis and transfer systems 115, may encounter an interactive element at a store (e.g., online or brick and mortar store) of a merchant associated with the user, during a P2P payment, or in a situation described in association with any of the trigger conditions listed herein.

In some examples, the interactive element includes a dataset to be transferred wirelessly using a short-range wireless communication interface, such as near field communication (NFC), radio frequency identification (RFID), Bluetooth®, personal area network (PAN), wireless local area network (WLAN), light-based communication, or a combination thereof. In some examples, providing the interactive element to the user device includes transmitting the dataset to the user device from a provider device. The interaction between the interactive element and the user device includes a wireless transfer of the dataset from the provider device to the user device via the short-range wireless communication interface. In some examples, the dataset can include a recommendation alert (e.g., recommendation alerts 620-625) or a pointer (e.g., a uniform resource locator (URL) or uniform resource identifier (URI)) pointing to a location (e.g., a network location or an interface of the local application 140) of the recommendation alert.

It should be understood that the user interfaces illustrated in FIGS. 1-6 are illustrative and can be configured in different arrangements, configurations, and the like, with additional and/or alternative content.

The customization and recommendation aspects described above with respect to the user interfaces of FIGS. 2-6 improves efficiency in the user interface and experience, and also dramatically reduces bandwidth usage and data storage requirements by limiting what is shared with users to recommended causes that are determined to be relevant to the user. For instance, by presenting contextual, and in some examples, time-sensitive information to a user via the user interface, techniques described herein reduce a number of steps through a user interface to reach a topic or cause that the user is interested in, thus improving user interface efficiency and reducing transfer and storage of data about topics or causes that are not relevant to the user.

Figure 7:
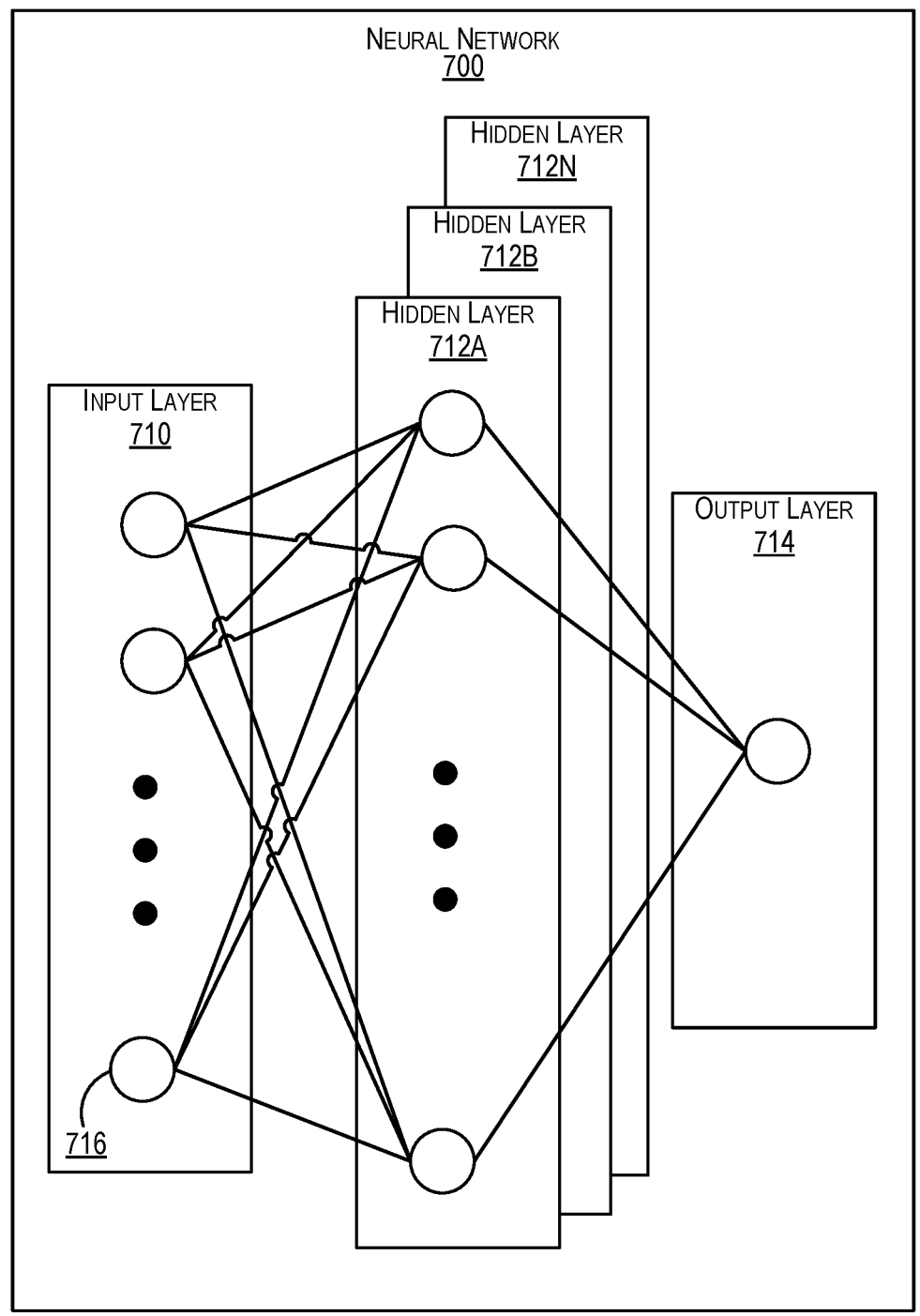
FIG. 7 is a block diagram illustrating an example of a neural network that can be used for analysis and transfer operations, in accordance with some examples.

FIG. 7 is a block diagram illustrating an example of a neural network 700 that can be used for analysis and transfer operations. The neural network (NN) 700 can include any type of deep network, such as a convolutional neural network (CNN), an autoencoder, a deep belief net (DBN), a Recurrent Neural Network (RNN), a Generative Adversarial Networks (GAN), a transformer, and/or other type of neural network. The neural network 700 may be an example of one of the trained ML model(s) 130. The neural network 700 may used by the analysis and transfer system(s) 115.

An input layer 710 of the neural network 700 includes input data. The input data of the input layer 710 can include dynamic information feeds (e.g., dynamic information feeds 110A-110C) from data source(s) 105, user information (e.g., user profile 125, dynamic information feed 110C) from the user data DS 120, or a combination thereof.

The neural network 700 includes multiple hidden layers 712, 712B, through 712N. The hidden layers 712, 712B, through 712N include "N" number of hidden layers, where "N" is an integer greater than or equal to one. The number of hidden layers can be made to include as many layers as needed for the given application. The neural network 700 further includes an output layer 714 that provides an output resulting from the processing performed by the hidden layers 712, 712B, through 712N.

In some examples, the output layer 714 can provide outputs that include identification of trending causes from the dynamic information feeds, identification of the at least one trending cause that is relevant to the user 145 and/or the user device 135 from the trending causes, or a combination thereof.

The neural network 700 is a multi-layer neural network of interconnected filters. Each filter can be trained to learn a feature representative of the input data. Information associated with the filters is shared among the different layers and each layer retains information as information is processed. In some cases, the neural network 700 can include a feed-forward network, in which case there are no feedback connections where outputs of the network are fed back into itself. In some cases, the network 700 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 710 can activate a set of nodes in the first hidden layer 712A. For example, as shown, each of the input nodes of the input layer 710 can be connected to each of the nodes of the first hidden layer 712A. The nodes of a hidden layer can transform the information of each input node by applying activation functions (e.g., filters) to this information. The information derived from the transformation can then be passed to and can activate the nodes of the next hidden layer 712B, which can perform their own designated functions. Example functions include convolutional functions, downscaling, upscaling, data transformation, and/or any other suitable functions. The output of the hidden layer 712B can then activate nodes of the next hidden layer, and so on. The output of the last hidden layer 712N can activate one or more nodes of the output layer 714, which provides a processed output image. In some cases, while nodes (e.g., node 716) in the neural network 700 are shown as having multiple output lines, a node has a single output and all lines shown as being output from a node represent the same output value.

In some cases, each node or interconnection between nodes can have a weight that is a set of parameters derived from the training of the neural network 700. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 710 using the different hidden layers 712, 712B, through 712N in order to provide the output through the output layer 714.

Figure 8A:
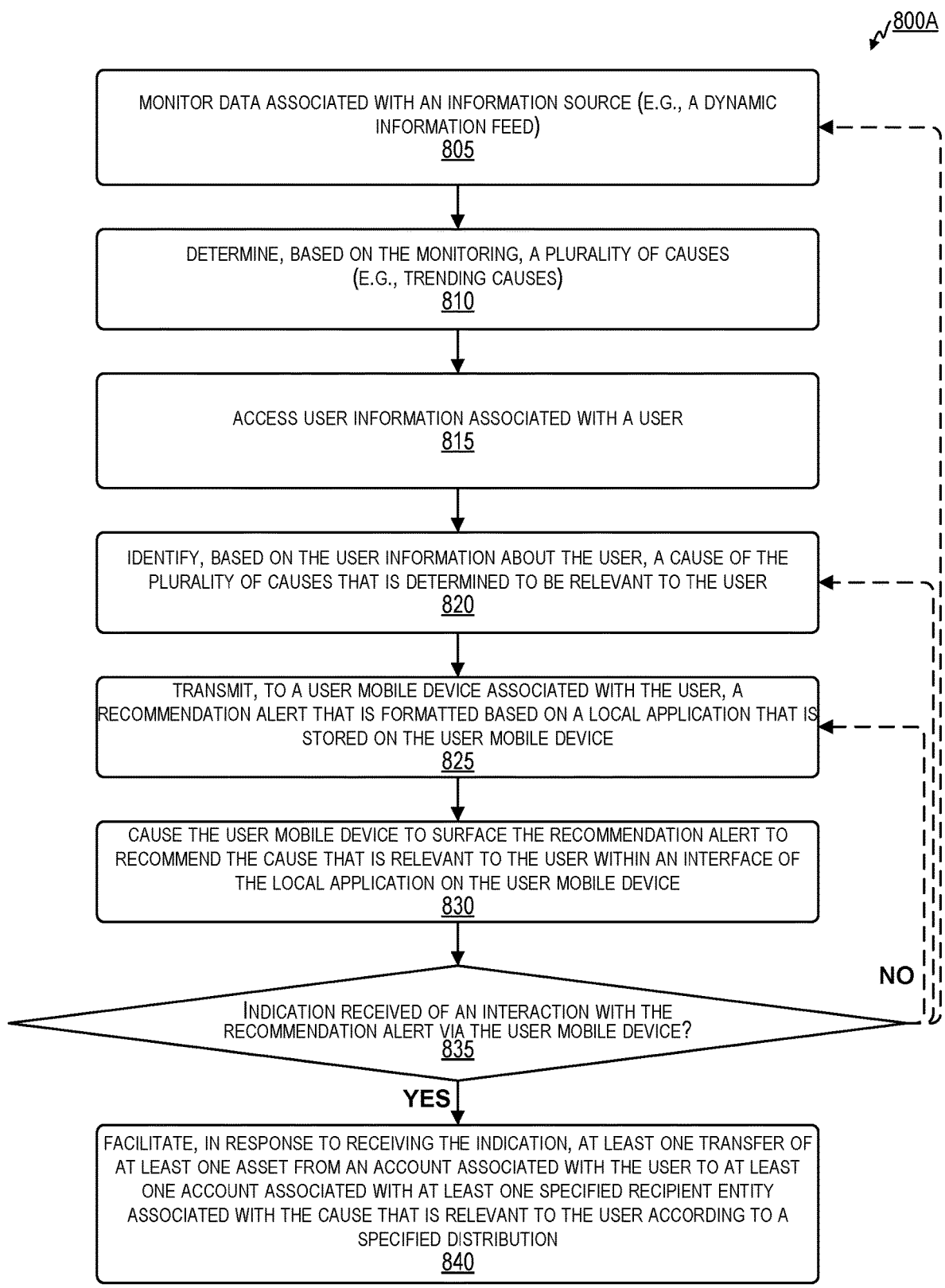
FIG. 8A is a flow diagram illustrating a process for facilitating asset transfer based on causes (e.g., trending causes) and/or topics (e.g., trending topics) relevant to a user, in accordance with some examples.

FIG. 8A is a flow diagram illustrating a process 800A for facilitating asset transfer based on causes (e.g., trending causes) and/or topics (e.g., trending topics) relevant to a user. In some examples, the process 800A is performed by an analysis and transfer system. The analysis and transfer system can include, for instance, the payment service environment 100, a payment platform, the data source(s) 105, the analysis and transfer system(s) 115, the user data DS 120, the trained ML model(s) 130, the user device 135, the local application 140, the distribution DS 160, the user interface 210, the user interface 215, the user interface 310, the user interface 315, the user interface 410, the user interface 415, the user interface 510, the user interface 515, the user interface 610, the user interface 615, the NN 700, the analysis and transfer system that performs the process 800B, the analysis and transfer system that performs the process 800C, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, the user device 1302, the server(s) 1304, the reader device(s) 1326, the datastore 1344, a computing system, an apparatus, a processor executing instructions stored in a non-transitory computer-readable storage medium, one or more components or subsets of any of the previously-listed systems, or a combination thereof. The order in which the operations of the process 800A are described is not intended to be construed as a limitation, and any number of the described blocks can be combined in any order and/or in parallel to implement the processes. In some embodiments, one or more blocks of the process 800A can be omitted entirely. Moreover, the process 800A can be combined in whole or in part with other processes, methods, actions, and/or operations described herein.

At operation 805, the analysis and transfer system is configured to, and can, monitor data associated with an information source. In some examples, the information source includes a dynamic information feed. Examples of the information source and/or the dynamic information feed include the dynamic information feed 110A, the dynamic information feed 110B, the dynamic information feed 110C, and/or other dynamic information feeds from the data source(s) 105 and/or the user data DS 120. In some examples, the analysis and transfer system can monitor the information source in real time, to retrieve new information from the information source as the new information is added at the information source. In some examples, the analysis and transfer system can also query for and retrieve historical data from the information source as part of monitoring the data.

In some examples, the information source and/or the dynamic information feed includes at least one of a social media post feed, a news feed from a news source, a weather feed from a weather source, a local feed from the local application (e.g., local application 140), a payment feed or transaction feed from a payment application (e.g., payment application 142), another data feed or information feed discussed herein, or a combination thereof.

At operation 810, the analysis and transfer system is configured to, and can, determine, based on the monitoring, a plurality of causes (e.g., trending causes) and/or topics (e.g., trending topics). Examples of causes (or trending causes) described herein include $JapanEarthquake, $Ukraine, $Election, $SaveTheOcean, $ClimateRelief, $WomenOwned, and $WorkersRights. Such causes (or trending causes) may also be referred to as topics (or trending topics).

In some examples, the analysis and transfer system is configured to, and can, parse the data associated with an information source and/or dynamic information feed. The analysis and transfer system can identify respective frequencies at which a plurality of causes are indicated in the dynamic information feed. The determining of the plurality of causes (or trending causes) can be based on the respective frequencies at which the plurality of causes are indicated in the information a source and/or dynamic information feed, the respective recency at which the plurality of causes are indicated in the information a source and/or dynamic information feed, or a combination thereof.

At operation 815, the analysis and transfer system is configured to, and can, access user information associated with a user (e.g., from the user data DS 120, the dynamic information feed 110C, or another data store or data source with user information). Accessing the user information can include receiving the user information, retrieving the user information, storing the user information, parsing the user information, and/or analyzing the user information. Examples of the user information includes the user profile 125, other user information from the user data DS 120, the dynamic information feed 110C, other dynamic information feed(s) associated with the user, other information source(s) associated with the user, or a combination thereof.

In some examples, the user information includes at least one of a purchase history of the user, a music playback history of the user, a video playback history of the user, a location history of the user, demographic information about the user, residence information about the user, one or more social network connections from the user to one or more additional users, a previously-identified preference of the user, other user information described herein, or a combination thereof.

At operation 820, the analysis and transfer system is configured to, and can, identify, based on the user information about the user, a cause (e.g., a trending cause) of the plurality of causes (or trending causes) that is determined (e.g., by the analysis and transfer system) to be relevant to the user. The cause (or trending cause) may be referred to as a topic (or trending topic). At operation 825, the analysis and transfer system is configured to, and can, transmit, to a user mobile device associated with the user, a recommendation alert that is formatted based on a local application that is stored on the user mobile device. At operation 830, the analysis and transfer system is configured to, and can, cause the user mobile device to surface the recommendation alert to recommend the cause (or trending cause) that is relevant to the user within an interface of the local application on the user mobile device. Examples of the local application include the instances of the local application 140 with the user interface illustrated in FIG. 1, with the user interface 210, with the user interface 215, with the user interface 310, with the user interface 315, with the user interface 410, with the user interface 415, with the user interface 510, with the user interface 515, with the user interface 610, with the user interface 615, other types of local application 140 described herein, the payment application 142, or a combination thereof. Examples of the recommendation alert include the recommendation alert 155, the recommendation alert 220, the recommendation alert 225, the recommendation alert 320, the recommendation alert 325, the recommendation alert 420, the recommendation alert 425, the recommendation alert 430, the recommendation alert 520, the recommendation alert 525, the recommendation alert 620, the recommendation alert 625, other recommended alerts described herein, or a combination thereof.

In some examples, identifying the cause (or trending cause) that is relevant to the user of the plurality of causes is also based on contextual information associated with at least one user activity of the user, such as a purchase being made (e.g., purchase 150), a social media post being accessed (e.g., user interface 210), a news headline being accessed (e.g., user interface 215), a song being played (e.g., user interface 310), a conversation being conducted (e.g., user interface 315), transactions being reviewed (e.g., user interface 410, user interface 415, user interface 510, user interface 515), an interactive element (e.g., interactive element 630 and/or interactive element 635) being interacted with, other contexts described herein, or a combination thereof.

In some examples, identifying the cause (or trending cause) that is relevant to the user of the plurality of causes is also based on an output of a trained machine learning model (e.g., trained ML model(s) 130 and/or NN 700) in response to input of at least the plurality of causes and the user information into the trained machine learning model.

In some examples, the interface of the local application is associated with payment for a transaction by the user. Transmitting the recommendation alert causes the user mobile device to surface the recommendation alert to recommend the cause (or trending cause) that is relevant to the user within the interface of the local application on the user mobile device based on the payment for the transaction by the user.

In some examples, the recommendation alert can be surfaced even if and when the user mobile device is offline, for instance by activating the local application on the user mobile device when the payment service system and/or the user mobile device come online, and/or by causing the payment service system and/or the user mobile device to come online and activate the local application. This addresses an Internet-centric challenge of alerting a user with time-sensitive information (e.g., a trending cause and/or recommended cause) even when an associated local application is closed or in the background, for instance by bringing the local application on the user mobile device from the background or closed state to a foreground state, which can be referred to as surfacing the local application.

At operation 835, the analysis and transfer system is configured to, and can, determine whether the analysis and transfer system has received an indication of an interaction with the recommendation alert via the user mobile device. If, at operation 835, the analysis and transfer system determines that the analysis and transfer system has received the indication of the interaction with the recommendation alert via the user mobile device, then operation 835 is followed by operation 840. If, at operation 835, the analysis and transfer system determines that the analysis and transfer system has not received the indication of the interaction with the recommendation alert via the user mobile device, then operation 835 returns back to operation 805, operation 820, or operation 830. In some examples, the indication of the interaction with the recommendation alert is an indication that a button associated with the recommendation alert has been pressed via the user mobile device, such as the "yes" button for the various recommended alerts described herein.

In some examples, the indication of the interaction with the recommendation alert is an indication that the user mobile device has interacted with an interactive element associated with the recommendation alert. For instance, the interactive element can include an optical glyph, and the indication of the interaction with the recommendation alert can be an indication that the user mobile device has scanned the optical glyph and decoded information that is optically encoded in the optical glyph. Examples of the interactive element include the interactive element 630 and/or the interactive element 635.

In some examples, the analysis and transfer system is configured to, and can, generate an interactive element that encodes the recommendation alert. Transmitting the recommendation alert includes transmitting the interactive element. Causing the user mobile device to surface the recommendation alert occurs in response to the user mobile device interacting with the interactive element. The indication of the interaction with the recommendation alert is an indication of the user mobile device interacting with the interactive element. Examples of the interactive element include the interactive element 630 and/or the interactive element 635.

In some examples, the analysis and transfer system is configured to, and can, generate an interactive element that encodes the recommendation alert. Causing the user mobile device to surface the recommendation alert includes causing the user mobile device to surface the interactive element. The indication of the interaction with the recommendation alert is an indication that a second user mobile device interacted with the interactive element while the interactive element is surfaced at the user mobile device. Examples of the interactive element include the interactive element 630 and/or the interactive element 635.

Examples of an optical glyph include a quick response (QR) code, a bar code, a data matrix, an Aztec code, Maxicode, a CodaBlock-F code, a Maxicode, a MicroPDF417 code, a PDF417 code, a Han Xin code, a DotCode, a snaptag, a color variant of any of the previously-listed glyph types (increasing storage capacity by using color as an additional dimension), or a combination thereof. The interactive element can include a dataset to be transferred wirelessly from a provider device to the user mobile device using a short-range wireless communication interface, such as NFC, RFID, Bluetooth®, PAN, WLAN, light-based communication, or a combination thereof. The indication of the interaction with the recommendation alert can be an indication that the user mobile device has received the dataset wirelessly from the provider device. In some examples, an interaction with the optical glyph (or another interactive element) provides a technical improvement to improve security by providing additional factors of authentication (e.g., two-factor authentication or N-factor authentication, where N is greater than or equal to two) for a transfer, on top of other factors of authentication such as passwords, personal identification number (PIN) codes, signatures and the like.

At operation 840, the analysis and transfer system is configured to, and can, facilitate, in response to receiving the indication, at least one transfer of at least one asset from an account associated with the user to at least one account associated with at least one specified recipient entity associated with the cause (or trending cause) that is relevant to the user according to a specified distribution. Examples of the at least one asset include funds, fiat currencies, security assets such as stocks or bonds, cryptocurrencies, non-fungible tokens (NFTs), or combinations thereof. Examples of the account associated with the user, and/or of the one account associated with at least one specified recipient entity, include a credit account, a debit account, a savings account, a checking account, a retirement account, a cryptocurrency wallet, a stock portfolio, a bond portfolio, or a combination thereof. Examples of the at least one recipient entity include a charity, a business, a non-profit organization, a governmental entity, another type of organization, a union, a person, a group of people, or a combination thereof. Examples of the specified distribution include the distributions 165 and/or other distributions stored in the distribution DS 160.

Examples of the at least one transfer includes at least one of a donation to an entity associated with the cause (or trending cause) that is that is relevant to the user, a tip for the entity, a purchase from the entity, an investment in the entity, or a combination thereof. In some examples, the analysis and transfer system is configured to, and can, aggregate the at least one transfer with at least one additional transfer for a tax ledger associated with the user. The tax ledger is configured for use in preparing an electronic tax return. An example is illustrated in the user interface 415. To prepare the tax ledger and/or electronic tax return, the analysis and transfer system is configured to, and can, provide automated designing, creating, and importing data into a viewable form, such as a tax return document, from outside applications such as information sources, dynamic data feed sources, user data data stores, local applications on a user device, recommendations generated based on these, and the like, for instance by deriving the context of the imported data and formatting in a form that is contextually relevant. The analysis and transfer system can automatically populate relevant fields the viewable forms with such data based on comparison of context information in the data with context information (e.g., field names) in the viewable forms to ensure that the forms are populated correctly. The analysis and transfer system can therefore provide improved importation of data and interoperability with third-party software, and can provide improved efficiency in use of such third-party software by bypassing manual form entry of data that is automatically imported and/or populated into the forms.

In some examples, the cause (or trending cause) that is that is relevant to the user is associated with environmental sustainability, and the user information is based on a history of the user with environmental sustainability over a predetermined time period. An example is illustrated with respect to the purchases from carbon-neutral businesses in the user interface 410.

In some examples, the analysis and transfer system is configured to, and can, create a plurality of identifiers corresponding to the plurality of causes. The analysis and transfer system can generate a plurality of records for a data store associated with the plurality of causes. A record of the plurality of records includes an association between an identifier of the plurality of identifiers and a distribution of at least one recipient entity associated with a trending cause of the plurality of causes. The specified distribution and the at least one specified recipient entity associated with the cause (or trending cause) that is relevant to the user are determined based on the data store. Examples of the data store include the distribution DS 160. Examples of the identifiers, and/or the specified identifier, include $JapanEarthquake, $Ukraine, $Election, $SaveTheOcean, $ClimateRelief, $WomenOwned, and $WorkersRights. Examples of the plurality of records, of the distribution, and of the specified distribution, include the distributions 165.

In some examples, the analysis and transfer system is configured to, and can, query the data store using a specified identifier associated with the cause (or trending cause) that is relevant to the user to determine a specified distribution of the at least one specified recipient entity associated with the cause (or trending cause) that is relevant to the user. Examples of the data store include the distribution DS 160. Examples of the identifiers, and/or the specified identifier, include $JapanEarthquake, $Ukraine, $Election, $SaveTheOcean, $ClimateRelief, $WomenOwned, and $WorkersRights. Examples of the plurality of records, of the distribution, and of the specified distribution, include the distributions 165.

In some examples, the at least one transfer can be one-time, recurring, round-up (from a purchase amount to the nearest whole number), a portion of direct deposits or payments, or a combination thereof. For instance, in some examples, the facilitating of the at least one transfer includes of the at least one asset includes facilitating a plurality of transfers periodically according to a predetermined schedule. Each of the plurality of transfers is a transfer of the at least one asset from the account associated with the user to the at least one account associated with the at least one specified recipient entity associated with the cause (or trending cause) that is relevant to the user according to the specified distribution.

In some examples, the analysis and transfer system is configured to, and can, generate, store, and/or cause the user mobile device to surface an indication (e.g., a map, list, table, chart, and/or set of hyperlinks) that includes, provides, and/or links to information (e.g., location, information about how received funds are used by the recipient entity, topics or causes of interest for the recipient entity, the website of the recipient entity) about the at least one recipient entity (e.g., of charities, merchants, non-profit organizations, governmental entities, other types of organizations, unions, individuals, groups of people, or combinations thereof). For instance, in an illustrative example, the indication can include a map that shows charities or merchants that support a cause or topic that is relevant to the user with links for further information about those charities or merchants, and that identifies charity proceeds for merchants where applicable. In some examples, for merchants, charity proceeds can be identified in a receipt. In some examples, the indication can be part of the recommendation alert.

The process 800A described herein provides a technical improvement by providing efficient context-based bridges and links between dynamic information feeds and payment facilitation. For instance, the techniques and systems described herein can automatically analyze dynamic information sources to identify causes (e.g., trending causes), can automatically set up identifiers and/or account(s) for assets to be transferred for the identified causes, can automatically determine distributions according to which different entities (e.g., different charities, merchants, governments, users, and the like) are to receive assets transferred for a specific cause, can automatically recommend causes to users based on user contextual information, and can automatically facilitate transfers of assets to the entities and/or account(s) associated with a cause based on a user selecting the cause (e.g., by accepting the recommendation).

Figure 8B:
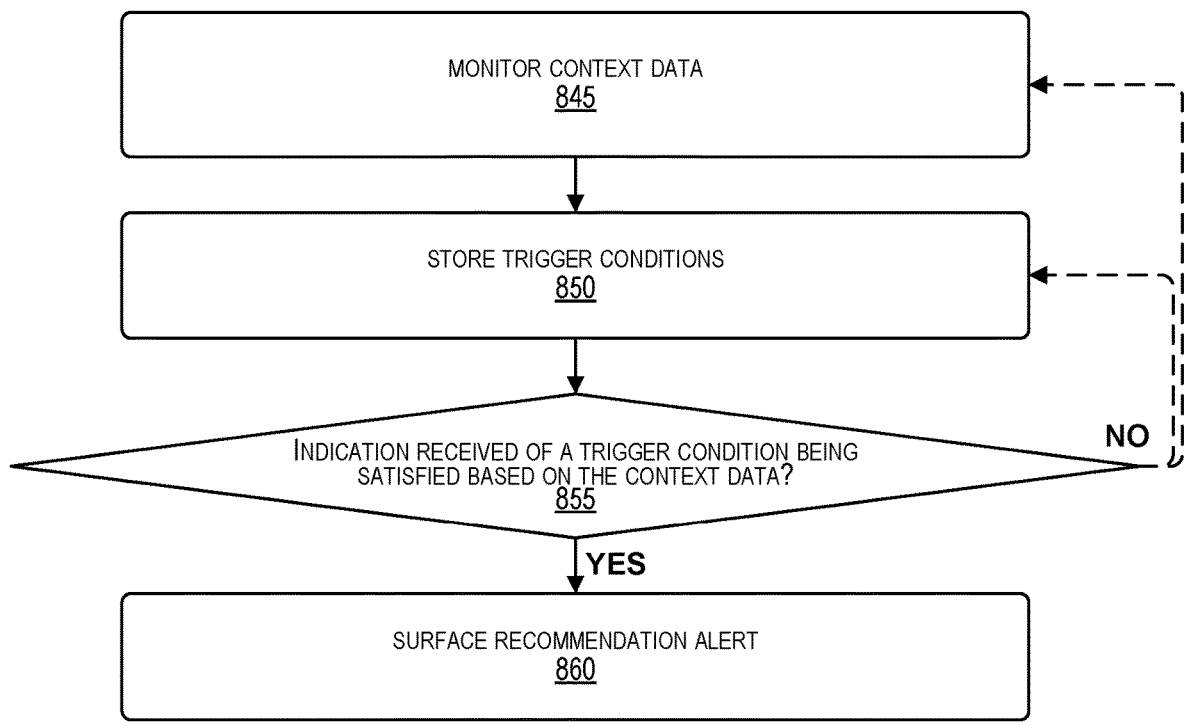
FIG. 8B is a flow diagram illustrating a process for surfacing causes (e.g., trending causes) and/or topics (e.g., trending topics) that are relevant to a user, in accordance with some examples.

FIG. 8B is a flow diagram illustrating a process 800B for surfacing causes (e.g., trending causes) and/or topics (e.g., trending topics) that are relevant to a user. In some examples, the process 800B indicates when (e.g., under which condition(s)) to surface the recommendation alert of operation 825 at the user mobile device of the process 800A. In some examples, the process 800B is performed by an analysis and transfer system. The analysis and transfer system can include, for instance, the payment service environment 100, a payment service system, a payment platform, the data source(s) 105, the analysis and transfer system(s) 115, the user data DS 120, the trained ML model(s) 130, the user device 135, the local application 140, the distribution DS 160, the user interface 210, the user interface 215, the user interface 310, the user interface 315, the user interface 410, the user interface 415, the user interface 510, the user interface 515, the user interface 610, the user interface 615, the NN 700, the analysis and transfer system that performs the process 800A, the analysis and transfer system that performs the process 800C, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, the user device 1302, the server(s) 1304, the reader device(s) 1326, the datastore 1344, a computing system, an apparatus, a processor executing instructions stored in a non-transitory computer-readable storage medium, one or more components or subsets of any of the previously-listed systems, or a combination thereof. The order in which the operations of the process 800B are described is not intended to be construed as a limitation, and any number of the described blocks can be combined in any order and/or in parallel to implement the processes. In some embodiments, one or more blocks of the process 800B can be omitted entirely. Moreover, the process 800B can be combined in whole or in part with other processes, methods, actions, and/or operations described herein.

At operation 845, the analysis and transfer system is configured to, and can, receive and/or monitor context data. The context data can concern, for instance, the user 145, other users, the user device 135, other user devices, the local application 140, the payment application 142, the analysis and transfer systems 115, the data source(s) 105, and/or interactions therebetween. In some examples, the context data can include information from a dynamic information feed (e.g., the dynamic information feed 110A, the dynamic information feed 110B, the dynamic information feed 110C), information from the data source(s) 105, information from the user data DS 120, information from the distribution DS 160, information from the local application 140, information from the payment application 142, information about a requested transaction, information about a transaction in progress, information about a recently-completed transaction, information about a transaction history, other contextual information described herein, or a combination thereof.

At operation 850, the analysis and transfer system is configured to, and can, store trigger conditions. As described further herein, a trigger condition can cause the presentation or surfacing of a recommendation alert as discussed further with respect to operation 860. As discussed above, trigger conditions can include conditions in which the user 145 is checking out at a POS terminal of a merchant who is associated with the relevant cause, conditions in which the user 145 is listening to a song by an artist who associated with the relevant cause, conditions in which the user 145 is sending or receiving a P2P payment to or from a second user who is connected to the relevant cause, conditions in which the user 145 is reading or viewing (e.g., via the user device 135) an article or social media post or message or image or video that is about the relevant cause, conditions in which the user 145 is reading or viewing (e.g., via the user device 135) an article or social media post or message or image or video by an author who is connected to the relevant cause, conditions in which the user 145 is has written or created or captured or posted (e.g., via the user device 135) an article or social media post or message or image or video that is about the relevant cause, conditions in which the user 145 has entered or is otherwise within a location or area that is associated with the relevant cause, conditions in which the user device 135 has interacted with an interactive element (e.g., a quick response (QR) code or near field communication (NFC) tag) that is associated with the relevant cause, various other surfacing trigger conditions illustrated or described herein, a new element (e.g., article or social media post or message or image or video) appears in a dynamic data feed, the presentation of a "year in review" or other review analysis relating to the cause, or a combination thereof. The occurrence and/or satisfaction of such trigger conditions can be identified, detected, and/or verified using the user device 135, the analysis and transfer system(s) 115, the data source(s) 105, the local application 140, a payment application 12, or a combination thereof, as a part of the surfacing process. Any of the examples above can include and/or be determined based on contextual information.

At operation 855, the analysis and transfer system is configured to, and can, determine whether a trigger condition is satisfied based on the context data received and/or monitored in operation 845. If the trigger condition is satisfied at operation 855, the analysis and transfer system moves on to operation 860, and surfaces the recommendation alert 155 (e.g., via the local application 140). If the trigger condition is not satisfied at operation 855, the analysis and transfer system returns to operation(s) 845 and/or 850.

Figure 8C:
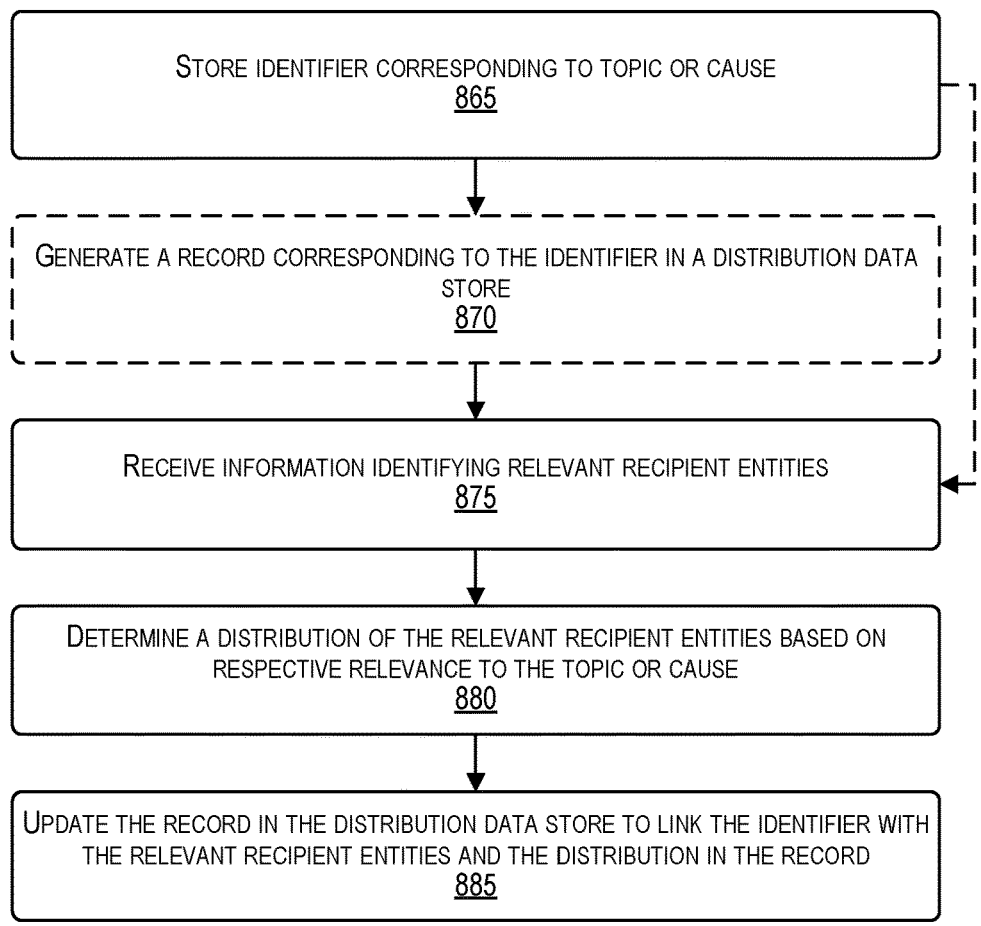
FIG. 8C is a flow diagram illustrating a process for linking an identifier to a distribution, in accordance with some examples.

FIG. 8C is a flow diagram illustrating a process 800C for linking an identifier to a distribution. In some examples, the process 800C links information identifying the specified distribution and/or the at least one specified recipient entity in operation 840 to a particular cause or topic (or an identifier thereof), such as the cause that is relevant to the user of operation 820, operation 830, and operation 840 of to process 800A. In some examples, the process 800C is performed by an analysis and transfer system. The analysis and transfer system can include, for instance, the payment service environment 100, a payment service system, a payment platform, the data source(s) 105, the analysis and transfer system(s) 115, the user data DS 120, the trained ML model(s) 130, the user device 135, the local application 140, the distribution DS 160, the user interface 210, the user interface 215, the user interface 310, the user interface 315, the user interface 410, the user interface 415, the user interface 510, the user interface 515, the user interface 610, the user interface 615, the NN 700, the analysis and transfer system that performs the process 800A, the analysis and transfer system that performs the process 800B, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, the user device 1302, the server(s) 1304, the reader device(s) 1326, the datastore 1344, a computing system, an apparatus, a processor executing instructions stored in a non-transitory computer-readable storage medium, one or more components or subsets of any of the previously-listed systems, or a combination thereof. The order in which the operations of the process 800C are described is not intended to be construed as a limitation, and any number of the described blocks can be combined in any order and/or in parallel to implement the processes. In some embodiments, one or more blocks of the process 800C can be omitted entirely. Moreover, the process 800C can be combined in whole or in part with other processes, methods, actions, and/or operations described herein.

At operation 865, the analysis and transfer system is configured to, and can, store an identifier corresponding to a topic or cause. Examples of the identifier include $JapanEarthquake, $Ukraine, $Election, $SaveTheOcean, $ClimateRelief, $WomenOwned, and $WorkersRights. For instance, the $JapanEarthquake identifier corresponds to a topic or cause associated with an earthquake in Japan, the $Ukraine identifier corresponds to a topic or cause associated with Ukraine, the $Election identifier corresponds to a topic or cause associated with an election, the $SaveTheOcean identifier corresponds to a topic or cause associated with the oceans (e.g., wildlife, rising water temperature, rising sea levels, pollution, climate, etc.), the $ClimateRelief identifier corresponds to a topic or cause associated with climate change and relief, the $WomenOwned identifier corresponds to a topic or cause associated with women-owned businesses and organizations, the $WorkersRights identifier corresponds to a topic or cause associated with worker's rights, and the like. If an identifier already exists for the topic or cause, the analysis and transfer system can identify the identifier, for instance by searching a data store (e.g., distribution DS 160) for a record with the identifier. If no identifier exists for the topic or cause, the analysis and transfer system can generate an identifier for the topic or cause, for instance by selecting a word, phrase, name, headline, hashtag identifier, or other indication of the topic or cause to be the identifier.

At operation 870, the analysis and transfer system is configured to, and can, generate a record corresponding to the identifier in a distribution data store (DS), such as the distribution DS 160. In some examples, the distribution DS can already have a record corresponding to the identifier, in which case the analysis and transfer system can perform operation 875 after operation 865.

At operation 875, the analysis and transfer system is configured to, and can, receive information identifying relevant recipient entities that are relevant to the topic or cause corresponding to the identifier. In some examples, the analysis and transfer system can receive the information from one or more users who may identify the relevant recipient entities. In some examples, the analysis and transfer system can automatically identify the relevant recipient entities. For instance, the analysis and transfer system can automatically identify relevant recipient entities by querying a data store that stores associations between various entities and various topics or causes that each is associated with, to identify which are associated with the topic or cause corresponding to the identifier. The analysis and transfer system can automatically identify relevant recipient entities by querying a data store that stores previous distribution(s) (e.g., distribution DS 160), and selecting recipient entities that were previously selected for similar topics or causes. For instance, for the $JapanEarthquake topic or cause, the analysis and transfer system can determine recipient entities associated with previous earthquakes in Japan, other natural disasters in Japan, previous earthquakes in other regions, and the like. The analysis and transfer system can automatically identify relevant recipient entities based on an output of a trained machine learning model (e.g., trained ML model(s) 130 and/or NN 700) in response to input of at least the identifier or some other indication(s) of the topic or cause into the trained machine learning model.

At operation 880, the analysis and transfer system is configured to, and can, determine a distribution of the relevant recipient entities based on respective relevance to the topic or cause. The distribution can indicate percentages, proportions, ratios, absolute amounts, and/or relative amounts that each of the relevant recipient entities is to receive (e.g., relative to other entities), as in the exemplary distributions 165 illustrated in FIG. 1. In some examples, the analysis and transfer system can receive the distribution from one or more users who may identify the distribution. In some examples, the analysis and transfer system can automatically identify the distribution. For instance, the analysis and transfer system can automatically identify the distribution by querying a data store that stores associations between various entities and various topics or causes that each is associated with, to identify which entities are more closely associated with the topic or cause corresponding to the identifier and therefore are to receive a higher proportion of the distribution. The analysis and transfer system can automatically identify the distribution by querying a data store that stores previous distribution(s) (e.g., distribution DS 160), and selecting a similar or identical distribution as was previously selected for one or more similar topics or causes. The analysis and transfer system can automatically identify the distribution based on an output of a trained machine learning model (e.g., trained ML model(s) 130 and/or NN 700) in response to input of at least the identifier, some other indication(s) of the topic or cause, and/or indications of the relevant recipient entities into the trained machine learning model.

At operation 885, the analysis and transfer system is configured to, and can, update the record in the distribution DS (e.g., the distribution DS 160) to link the identifier with the relevant recipient entities and the distribution. For instance, the analysis and transfer system can modify the record generated in operation 870 to associate with the identifier with the relevant recipient entities and/or the distribution.

The recommendation alert 155 can be generated and/or surfaced (e.g., as discussed with respect to the process 800A and/or the process 800B) before, during, or after determining the recipient entities (in operation 875) and/or the distribution (in operation 880). For instance, once the identifier is generated and/or stored in operation 865, and/or once the record is generated in operation 870, a recommendation alert 155 can be generated and/or surfaced. If a user chooses to proceed with an asset transfer corresponding to the topic or cause based on the identifier, the asset transfer can be scheduled to be initiated and/or processed once the analysis and transfer system determines the recipient entities (in operation 875) and/or the distribution (in operation 880), and/or once the analysis and transfer system updates the record (in operation 885).

Figure 9:
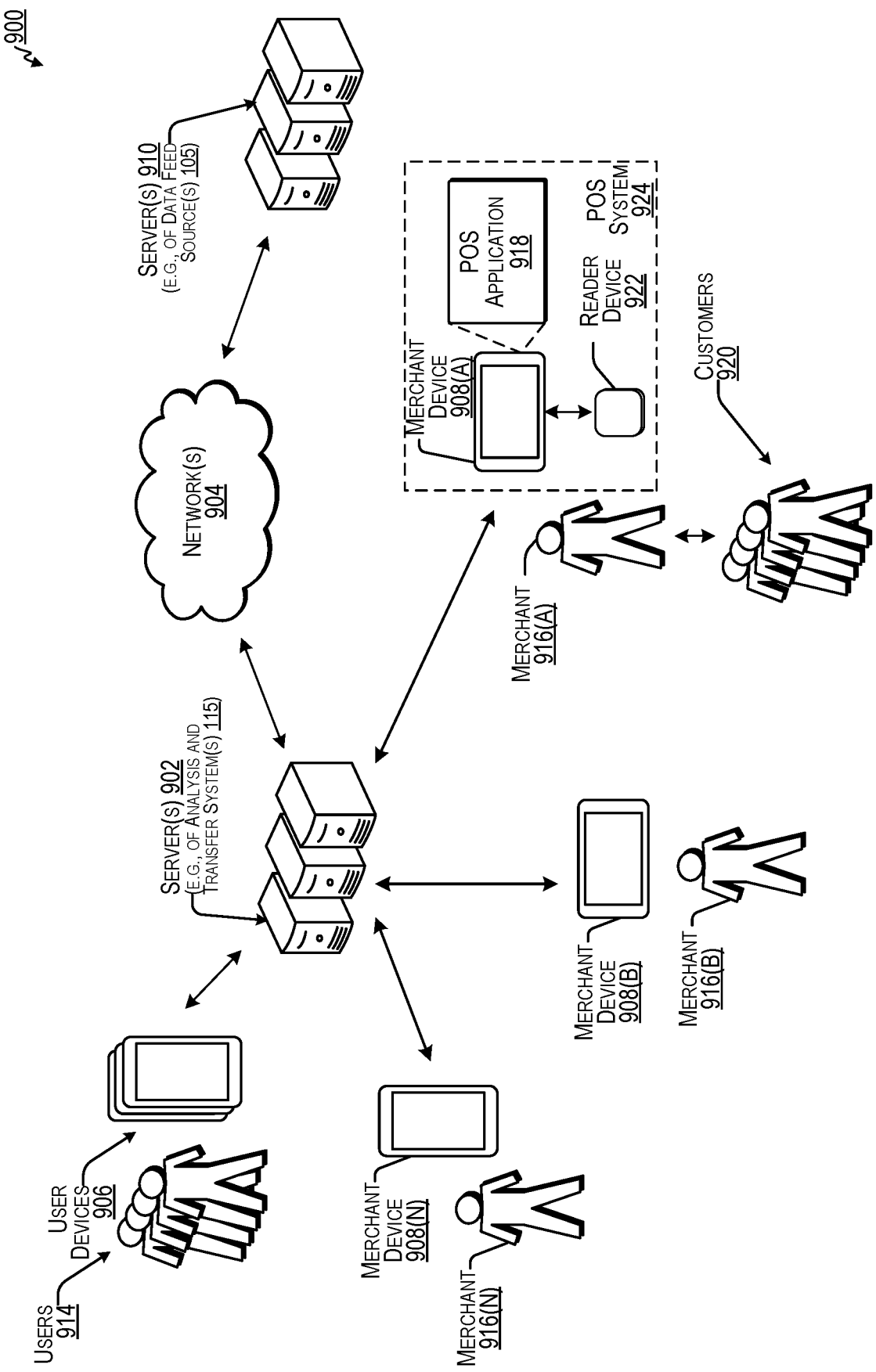
FIG. 9 is a block diagram illustrating an environment that includes various devices associated with one or more merchants, in accordance with some examples.

FIG. 9 is a block diagram illustrating an environment 900 that includes various devices associated with one or more merchants. The environment 900 includes server(s) 902 that can communicate over a network 904 with user devices 906 (which, in some examples can be merchant devices 908 (individually, 908(A)-908(N))) and/or server(s) 910 associated with third-party service provider(s). The server(s) 902 can be associated with a service provider that can provide one or more services for the benefit of users 914, as described below. Actions attributed to the service provider can be performed by the server(s) 902.

The user 145 may be an example of one of the users 914, the customers 920, and/or merchants 916(A)-916(N). The user device 135 may be an example of one of the user devices 906, the merchant devices 908(A)-908(N), the reader device 922, and/or the POS system 924. Examples of the local application 140 can include the POS application 918 as well as any local applications that run on the user devices 906, the merchant devices 908(A)-908(N), the reader device 922, and/or the POS system 924. In some examples, the merchants 916(A)-916(N) can be recipient entities, and the customers 920 (and/or the users 914) can be examples of the user 145, with the purchase(s) described in FIG. 9 being examples of the asset transfers recommended via the recommendation alert 155.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include merchants 916 (individually, 916(A)-916(N)). In an example, the merchants 916 can operate respective merchant devices 908, which can be user devices 906 configured for use by merchants 916. For the purpose of this discussion, a "merchant" can be any entity that offers items (e.g., goods or services) for purchase or other means of acquisition (e.g., rent, borrow, barter, etc.). The merchants 916 can offer items for purchase or other means of acquisition via brick-and-mortar stores, mobile stores (e.g., pop-up shops, food trucks, etc.), online stores, combinations of the foregoing, and so forth. In some examples, at least some of the merchants 916 can be associated with a same entity but can have different merchant locations and/or can have franchise/franchisee relationships. In additional or alternative examples, the merchants 916 can be different merchants. That is, in at least one example, the merchant 916(A) is a different merchant than the merchant 916(B) and/or the merchant 916(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 908 can have an instance of a POS application 918 stored thereon. The POS application 918 can configure the merchant device 908 as a POS terminal, which enables the merchant 916(A) to interact with one or more customers 920. As described above, the users 914 can include customers, such as the customers 920 shown as interacting with the merchant 916(A). For the purpose of this discussion, a "customer" can be any entity that acquires items from merchants. While only two customers 920 are illustrated in FIG. 9, any number of customers 920 can interact with the merchants 916. Further, while FIG. 9 illustrates the customers 920 interacting with the merchant 916(A), the customers 920 can interact with any of the merchants 916.

In at least one example, interactions between the customers 920 and the merchants 916 that involve the exchange of funds (from the customers 920) for items (from the merchants 916) can be referred to as "transactions." In at least one example, the POS application 918 can determine transaction data associated with the POS transactions. Transaction data can include payment information, which can be obtained from a reader device 922 associated with the merchant device 908(A), user authentication data, purchase amount information, point-of-purchase information (e.g., item(s) purchased, date of purchase, time of purchase, etc.), etc. The POS application 918 can send transaction data to the server(s) 902 such that the server(s) 902 can track transactions of the customers 920, merchants 916, and/or any of the users 914 over time. Furthermore, the POS application 918 can present a UI to enable the merchant 916(A) to interact with the POS application 918 and/or the service provider via the POS application 918.

In at least one example, the merchant device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the merchant device 908(A), such as a microphone port, a headphone port, an audio-jack, a data port, or other suitable port. In additional or alternative examples, the reader device 922 can be coupled to the merchant device 908(A) via another wired or wireless connection, such as via a Bluetooth®, BLE, and so on. Additional details are described below with reference to FIG. 12. In some examples, the reader device 922 can read information from alternative payment instruments including, but not limited to, wristbands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server(s) 902, which can provide, among other services, a payment processing service. The server(s) 902 associated with the service provider can communicate with server(s) 910, as described below. In this manner, the POS terminal and reader device 922 may collectively process transaction(s) between the merchants 916 and customers 920. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server(s) 910 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 924, the server(s) 902, and/or the server(s) 910 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s)

904. The server(s) 902 may send the transaction data to the server(s) 910. As described above, in at least one example, the server(s) 910 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 910 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 910 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 910 associated therewith), and a payment authorization message is communicated from the issuer to the POS device via a path opposite of that described above, or via an alternate path.

As described above, the server(s) 910, which can be associated with payment service provider(s), may determine whether the transaction is authorized based on the transaction data, as well as information relating to parties to the transaction (e.g., the customer 920 and/or the merchant 916(A)). The server(s) 910 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 910 to authorize or decline transactions.

Based on the authentication notification that is received by the POS system 924 from server(s) 902, the merchant 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 914 can access all of the services of the service provider. In other examples, the users 914 can have gradated access to the services, which can be based on risk tolerance, IDV outputs, subscriptions, and so on. In at least one example, access to such services can be availed to the merchants 916 via the POS application 918. In additional or alternative examples, each service can be associated with its own access point (e.g., application, web browser, etc.).

The service provider can offer payment processing services for processing payments on behalf of the merchants 916, as described above. For example, the service provider can provision payment processing software, payment processing hardware and/or payment processing services to merchants 916, as described above, to enable the merchants 916 to receive payments from the customers 920 when conducting POS transactions with the customers 920. For instance, the service provider can enable the merchants 916 to receive cash payments, payment card payments, and/or electronic payments from customers 920 for POS transactions and the service provider can process transactions on behalf of the merchants 916.

As the service provider processes transactions on behalf of the merchants 916, the service provider can maintain accounts or balances for the merchants 916 in one or more ledgers. For example, the service provider can analyze transaction data received for a transaction to determine an amount of funds owed to a merchant 916(A) for the transaction. In at least one example, such an amount can be a total purchase price less fees charged by the service provider for providing the payment processing services. Based on determining the amount of funds owed to the merchant 916(A), the service provider can deposit funds into an account of the merchant 916(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 916(A) to a bank account of the merchant 916(A) that is held at a bank or other financial institution (e.g., associated with the server(s) 910). Scheduled deposits can occur at a prearranged time after a POS transaction is funded, which can be a business day after the POS transaction occurred, or sooner or later. In some examples, the merchant 916(A) can access funds prior to a scheduled deposit. For instance, the merchant 916(A) may have access to same-day deposits (e.g., wherein the service provider deposits funds from the stored balance to a linked bank account of the merchant on a same day as POS transaction, in some examples prior to the POS transaction being funded)

or instant deposits (e.g., wherein the service provider deposits funds from the stored balance to a linked bank account of the merchant on demand, such as responsive to a request). Further, in at least one example, the merchant 916(A) can have a payment instrument that is linked to the stored balance that enables the merchant to access the funds without first transferring the funds from the account managed by the service provider to the bank account of the merchant 916(A).

In at least one example, the service provider may provide inventory management services. That is, the service provider may provide inventory tracking and reporting. Inventory management services may enable the merchant 916(A) to access and manage a database storing data associated with a quantity of each item that the merchant 916(A) has available (i.e., an inventory). Furthermore, in at least one example, the service provider can provide catalog management services to enable the merchant 916(A) to maintain a catalog, which can be a database storing data associated with items that the merchant 916(A) has available for acquisition (i.e., catalog management services). In at least one example, the catalog may include a plurality of data items and a data item of the plurality of data items may represent an item that the merchant 9121(A) has available for acquisition. The service provider can offer recommendations related to pricing of the items, placement of items on the catalog, and multi-party fulfilment of the inventory.

In at least one example, the service provider can provide business banking services, which allow the merchant 916(A) to track deposits (from payment processing and/or other sources of funds) into an account of the merchant 916(A), payroll payments from the account (e.g., payments to employees of the merchant 916(A)), payments to other merchants (e.g., business-to-business) directly from the account or from a linked debit card, withdrawals made via scheduled deposit and/or instant deposit, etc. Furthermore, the business banking services can enable the merchant 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 916 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 916. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 912 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 916. In at least one example, the service provider can recommend and/or generate content items to supplement omni-channel presences of the merchants 916. That is, if a merchant of the merchants 916 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 914 to set schedules for scheduling appointments and/or users 914 to schedule appointments.

In some examples, the service provider can provide restaurant management services to enable users 914 to make and/or manage reservations, to monitor front-of-house and/or back-of-house operations, and so on. In such examples, the merchant device(s) 908 and/or server(s) 902 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 906.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 914 may be new to the service provider such that the user 914 that has not registered (e.g., subscribed to receive access to one or more services offered by the service provider) with the service provider. The service provider can offer onboarding services for registering a potential user 914 with the service provider. In some examples, onboarding can involve presenting various questions, prompts, and the like to a potential user 914 to obtain information that can be used to generate a profile for the potential user 914. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 914 providing all necessary information, the potential user 914 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 910). That is, the service provider can offer IDV services to verify the identity of users 914 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 914 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 910 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 902) and/or the server(s) 910 via the network(s) 904. In some examples, the merchant device(s) 908 are not capable of connecting with the service provider (e.g., the server(s) 902) and/or the server(s) 910, due to a network connectivity issue, for example. In additional or alternative examples, the server(s) 902 are not capable of communicating with the server(s) 910 due to network connectivity issue, for example. In such examples, devices may operate in "offline" mode where at least some payment data is stored (e.g., on the merchant device(s) 908) and/or the server(s) 902 until connectivity is restored and the payment data can be transmitted to the server(s) 902 and/or the server(s) 910 for processing.

In at least one example, the service provider can be associated with a hub, such as an order hub, an inventory hub, a fulfillment hub and so on, which can enable integration with one or more additional service providers (e.g., associated with the additional server(s) 910). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 906 that are in communication with one or more server computing devices 902 of the service provider. That is, techniques described herein are directed to a specific implementation—or, a practical application—of utilizing a distributed system of user devices 906 that are in communication with one or more server computing devices 902 of the service provider to perform a variety of services, as described above. The unconventional configuration of the distributed system described herein enables the server(s) 902 that are remotely-located from end-users (e.g., users 914) to intelligently offer services based on aggregated data associated with the end-users, such as the users 914 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

Figure 10:
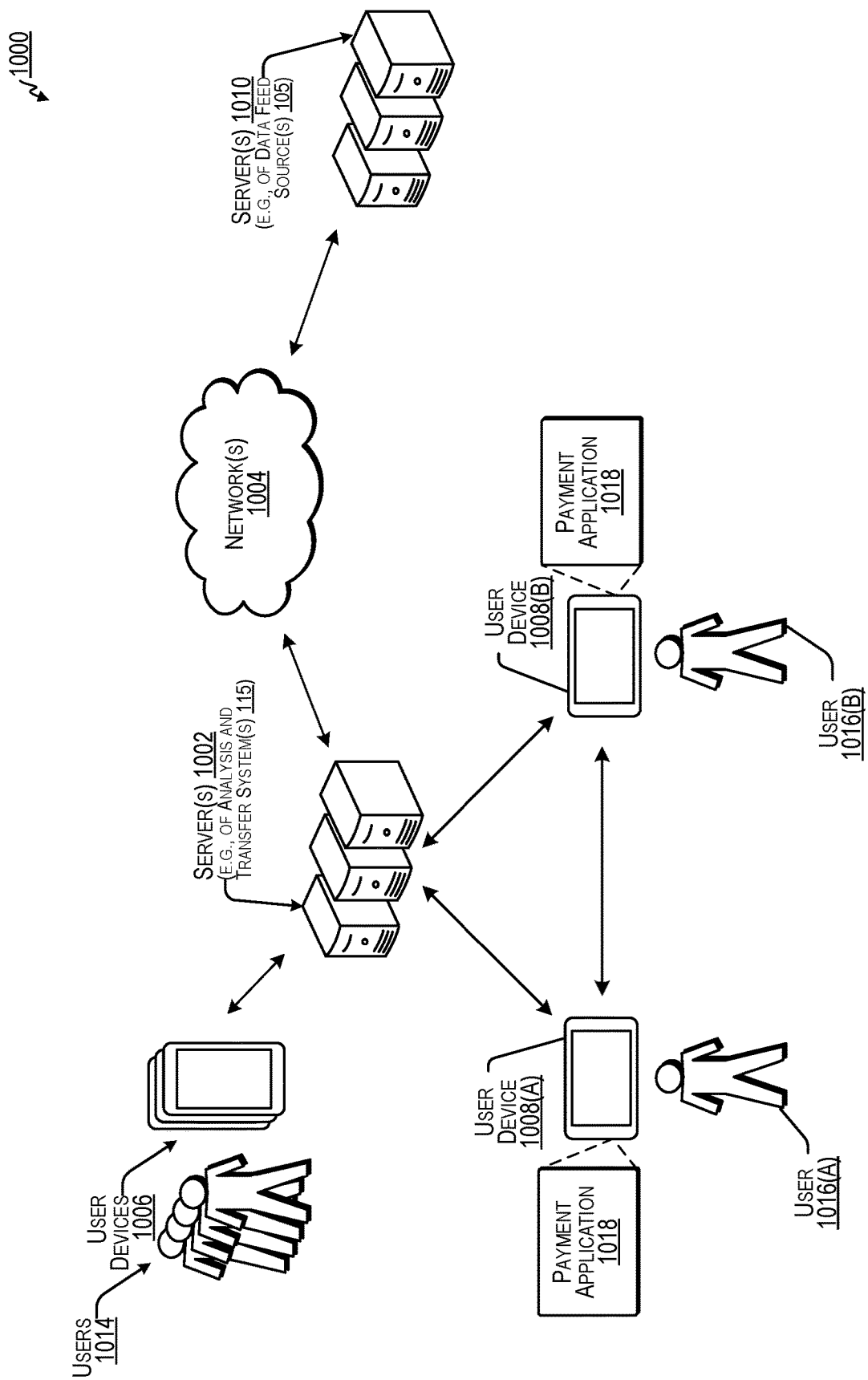
FIG. 10 is a block diagram illustrating an environment that includes various devices associated with one or more payment services, in accordance with some examples.

FIG. 10 is a block diagram illustrating an environment 1000 that includes various devices associated with one or more payment services. The environment 1000 includes server(s) 1002 that can communicate over a network 1004 with user devices 1006 (which, in some examples can be user devices 1008 (individually, 1008(A), 1008(B)) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10.

The user 145 may be an example of one of the users 1014 and/or users 1016(A)-1016(B). The user device 135 may be an example of one of the user devices 1006 and/or the user devices 1008(A)-1008(B). Examples of the local application 140 can include the payment application 1018 as well as any local applications that run on the user devices 1006. In some examples, the user 1016(B) can be a recipient entity, and the user 1016(A) can be an example of the user 145, with the P2P payment described in FIG. 10 being an example of the asset transfers recommended via the recommendation alert 155.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A)) can send a request to the service provider to transfer an asset (e.g., fiat currency, non-fiat currency, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 1014.

Figure 11:
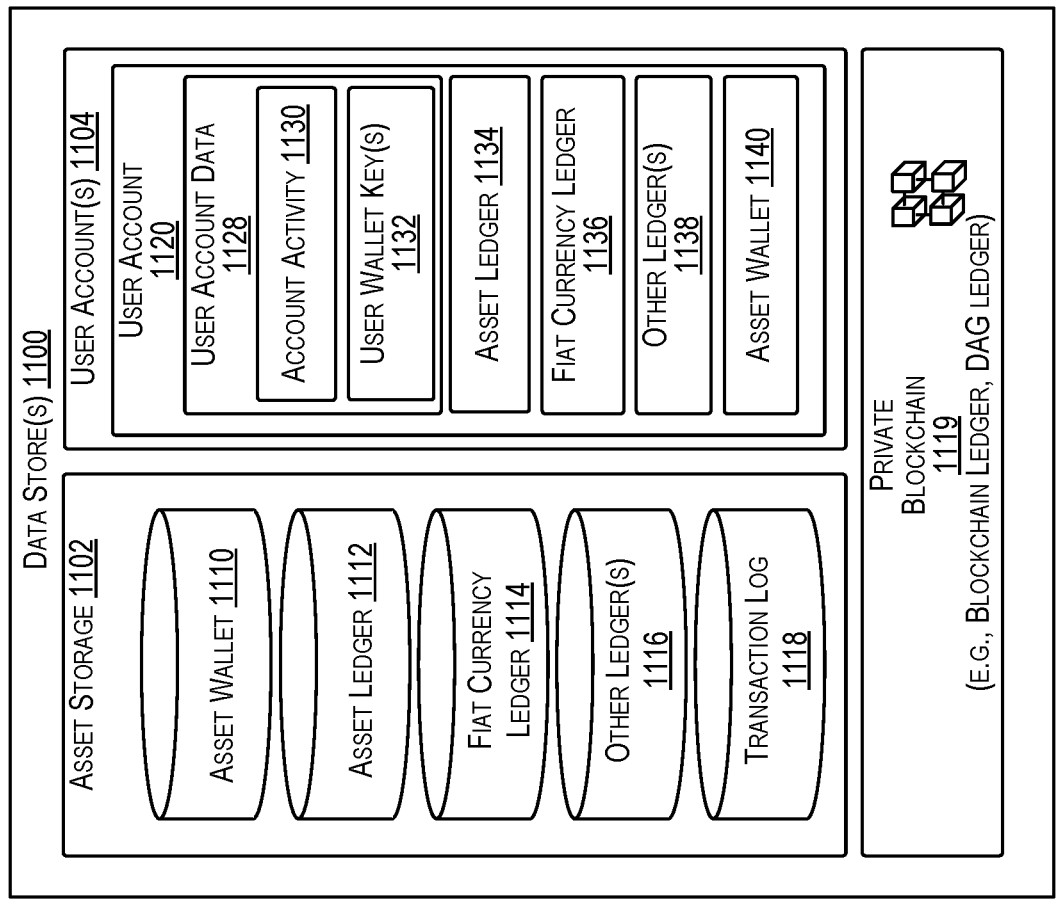
FIG. 11 is a block diagram illustrating a ledger system, in accordance with some examples.

FIG. 11 is a block diagram illustrating a ledger system. The ledger system of FIG. 11 may provide additional details associated with a ledger system that may be used with the systems of FIG. 9 and/or FIG. 10. The ledger system can enable users 1014 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 10 or a third-party service provider associated with the server(s) 1010. In examples where the content provider is a third-party service provider, the server(s) 1010 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message.

The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1014 to transfer fiat currency, non-fiat currency, cryptocurrency, securities, or other assets, or portions thereof, to other users 1014. In at least one example, individual users can be associated with user accounts. Additional details associated with user accounts and the transfer of assets between users 1014 are described below with reference to FIG. 11.

Furthermore, the service provider of FIG. 10 can enable users 1014 to perform banking transactions via instances of the payment application 1018. For example, users can configure direct deposits or other deposits for adding assets to their various ledgers/balances. Further, users 1014 can configure bill pay, recurring payments, and/or the like using assets associated with their accounts. In addition to sending and/or receiving assets via peer-to-peer transactions, users 1014 buy and/or sell assets via asset networks such as cryptocurrency networks, securities networks, and/or the like.

FIG. 11 illustrates example data store(s) 1100 that can be associated with the server(s) 1002.

In at least one example, the data store(s) 1100 can store assets in an asset storage 1102, as well as data in user account(s) 1104, merchant account(s) 1106, and/or customer account(s) 1108. In at least one example, the asset storage 1102 can be used to store assets managed by the service provider of FIG. 10. In at least one example, the asset storage 1102 can be used to record whether individual of the assets are registered to users. For example, the asset storage 1102 can include an asset wallet 1110 for storing records of assets owned by the service provider of FIG. 10, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1110 can communication with the asset network via one or more components associated with the server(s) 1002.

Account(s) associated with the user 145, accounts associated with the recipient entities (according to the distributions 165), the data source(s) 105, the user data DS 120, the user profile 125, and/or the distribution DS 160 may be examples of the user account 1120, the asset wallet 1140, and/or the asset wallet 1110, and/or may be associated with the fiat currency ledger 1114, the fiat currency ledger 1136, the asset ledger 1112, the asset ledger 1134, and/or the private blockchain 1119.

The asset wallet 1110 can be associated with one or more addresses and can vary addresses used to acquire assets (e.g., from the asset network(s)) so that its holdings are represented under a variety of addresses on the asset network. In examples where the service provider of FIG. 10 has its own holdings of cryptocurrency (e.g., in the asset wallet 1110), a user can acquire cryptocurrency directly from the service provider of FIG. 10. In some examples, the service provider of FIG. 10 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 1014. Specifically, the asset storage 1102 may include asset wallet 1110 (e.g., asset ledger), fiat currency ledger 1114, and other ledger(s) 1116, which can be used to record transfers of assets between users 1014 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider of FIG. 10. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider of FIG. 10. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider of FIG. 10 can record transactions taking place within the service provider of FIG. 10 involving cryptocurrency until the number of transactions has exceeded a determined limit (e.g., number of transactions, storage space allocation, etc.). Based at least in part on determining that the limit has been reached, the service provider of FIG. 10 can publish the transactions in the private blockchain 1119 to a public blockchain (e.g., associated with the asset network), where miners can verify the transactions and record the transactions to blocks on the public blockchain. In at least one example, the service provider of FIG. 10 can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108. In at least one example, the user account(s) 1104 may store records of user accounts associated with the users 1014. In at least one example, the user account(s) 1104 can include a user account 1120, which can be associated with a user (of the users 1014). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be unique to the asset network or other asset networks.

In addition to the user account data 1128, the user account 1120 can include ledger(s) for account(s) managed by the service provider of FIG. 10, for the user. For example, the user account 1120 may include an asset ledger 1134, a fiat currency ledger 1136, and/or one or more other ledgers 1138. The ledger(s) can indicate that a corresponding user utilizes the service provider of FIG. 10 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 10.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1132. In some examples, the user wallet key(s) 1132 may be generated for the user upon request. User wallet key(s) 1132 can be requested by the user in order to send, exchange, or otherwise control the balance of cryptocurrency held by the service provider of FIG. 10 (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 10 and the value is credited as a balance in asset ledger 1134), by purchasing currency in the form associated with the account using currency in a different form (e.g., buying a value of cryptocurrency from the service provider of FIG. 10 using a value of fiat currency reflected in fiat currency ledger 206, and crediting the value of cryptocurrency in asset ledger 1134), or by conducting a transaction with another user (customer or merchant) of the service provider of FIG. 10 wherein the account receives incoming currency (which can be in the form associated with the account or a different form, in which the incoming currency may be converted to the form associated with the account). In some examples, the user account data 1128 can include preferences for maintaining balances of individual of the ledgers. For example, the service provider of FIG. 10 can automatically debit the fiat currency ledger 1136 to increase the asset ledger 1134, or another account associated with the user whenever the cryptocurrency balance (e.g., of the asset ledger 1134) falls below a stated level (e.g., a threshold). Conversely, in some embodiments, the service provider of FIG. 10 can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with third-party server(s)) unrelated to the service provider of FIG. 10 (i.e., an external account). In at least one example, the user can transfer all or a portion of a balance of the cryptocurrency stored in the third-party cryptocurrency wallet to the service provider of FIG. 10. Such a transaction can require the user to transfer an amount of the cryptocurrency in a message signed by user's private key to an address provided by the service provider of FIG. 10. In at least one example, the transaction can be sent to miners to bundle the transaction into a block of transactions and to verify the authenticity of the transactions in the block. Once a miner has verified the block, the block is written to a public, distributed blockchain where the service provider of FIG. 10 can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 10. As described above, in some examples, the service provider of FIG. 10 can acquire cryptocurrency from a third-party source (e.g., associated with third-party server(s)). In such examples, the asset wallet 1110 can be associated with different addresses and can vary addresses used to acquire cryptocurrency so that its holdings are represented under a variety of addresses on a blockchain. When the service provider of FIG. 10 has their own holdings of cryptocurrency, users can acquire cryptocurrency directly from the service provider of FIG. 10. In some examples, the service provider of FIG. 10 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 10 has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider of FIG. 10 can credit the asset ledger 1134 of the user. Additionally, while the service provider of FIG. 10 recognizes that the user retains the value of the transferred cryptocurrency through crediting the asset ledger 1134, any person that inspects the blockchain will see the cryptocurrency as having been transferred to the service provider of FIG. 10. In some examples, the asset wallet 1110 can be associated with many different addresses. In such examples, any person that inspects the blockchain may not easily associate all cryptocurrency stored in asset wallet 1110 as belonging to the same entity. It is this presence of a private ledger that is used for real-time transactions and maintained by the service provider of FIG. 10, combined with updates to the public ledger at other times, that allows for extremely fast transactions using cryptocurrency to be achieved. In some examples, the "private ledger" can refer to the asset wallet 1110 (e.g., asset ledger), which in some examples, can utilize the private blockchain 1119, as described herein. The "public ledger" can correspond to a public blockchain associated with the asset network.

In at least one example, a user's asset ledger 1134, fiat currency ledger 1136, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider of FIG. 10 and used to fund the asset ledger 1134 of the user.

As addressed above, in some examples, users can also have other accounts maintained by the service provider of FIG. 10. For example, a user can also have an account in U.S. dollars, which can be tracked, for example, via the fiat currency ledger 1136. Such an account can be funded by transferring money from a bank account at a third-party bank to an account maintained by the service provider of FIG. 10 as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider of FIG. 10. Internal payment cards can be linked to one or more of the accounts associated with the user account 1120. In some embodiments, options with respect to internal payment cards can be adjusted and managed using an application (e.g., the payment application 1018).

In at least one example, as described above, each ledger can correspond to an account of the user that is managed by the service provider of FIG. 10. In at least one example, individual of the accounts can be associated with a wallet or a stored balance for use in payment transactions, peer-to-peer transactions, payroll payments, etc.

In at least one example, the user account 1120 can be associated with a asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based at least in part on a balance of the asset ledger 1134. In at least one example, funds availed via the asset wallet 1140 can be stored in the asset wallet 1140 or the asset wallet 1110. Funds availed via the asset wallet 1110 can be tracked via the asset ledger 1134. The asset wallet 1140, however, can be associated with additional cryptocurrency funds.

In at least one example, when the service provider of FIG. 10 includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider of FIG. 10, the customer can send a message signed by its private key including its wallet address (i.e., of the customer) and identifying the cryptocurrency and value to be transferred to the merchant's asset wallet 1140. The service provider of FIG. 10 can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 10 is an aspect of the technology disclosed that enables technical advantages of increased processing speed and improved security.

Figure 12:
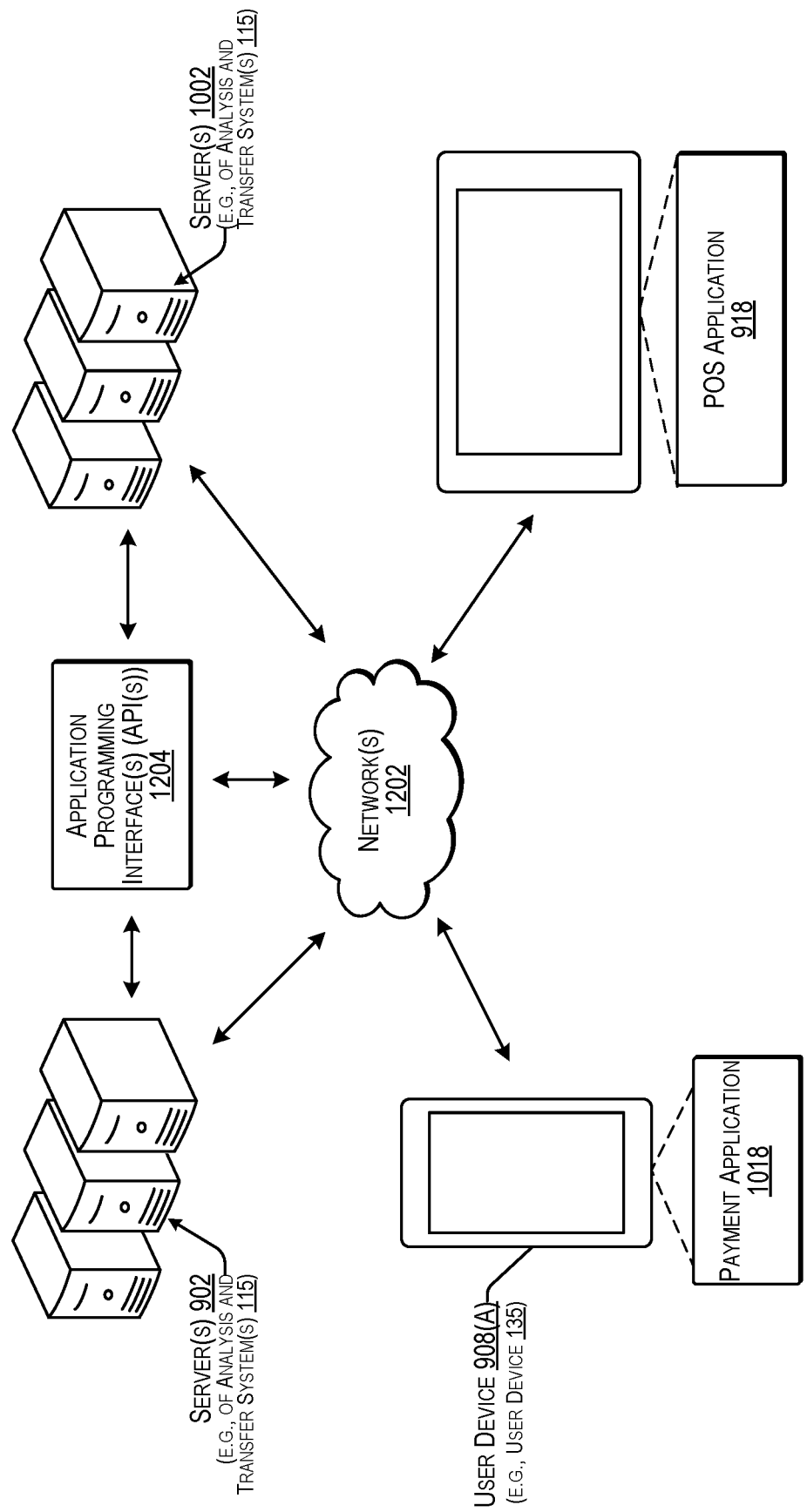
FIG. 12 is a block diagram illustrating an example environment wherein the environment of FIG. 9 and the environment of FIG. 10 can be integrated to enable payments at the point-of-sale using assets associated with user accounts in the peer-to-peer environment of FIG. 10, in accordance with some examples.

FIG. 12 illustrates an example environment 1200 wherein the environment 900 of FIG. 9 and the environment 1000 of FIG. 10 can be integrated to enable payments at the point-of-sale using assets associated with user accounts in the peer-to-peer environment 1000 of FIG. 10. As illustrated, each of the components can communicate with one another via one or more networks 1202. In some examples, one or more APIs 1204 or other functional components can be used to facilitate such communication.

In at least one example, the example environment 1200 can enable contactless payments, via integration of peer-to-peer payment, or other payment making, platform(s) and payment processing platform(s), are described herein. For the purpose of FIG. 12, the environment 900 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 908(A). In such an example, the POS application 918, associated with a payment processing platform and executable by the merchant device 908(A) of the merchant, can present a Quick Response (QR) code, or other code that can be used to identify a transaction (e.g., a transaction code), in association with a transaction between the customer and the merchant. The QR code, or other transaction code, can be provided to the POS application 918 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 902 and/or server(s) 1002.

Based at least in part on the integration of the peer-to-peer payment platform and the payment processing platform (e.g., via the API), the server(s) 902 and/or 1002 associated with each can exchange communications with each other and with a payment application 1018 associated with the peer-to-peer payment platform and/or the POS application 918—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 918 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 908(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 918 can cause a text message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1008(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 918 of a merchant device 908(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant—via the POS application 918 on the merchant device 908(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 918, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 13:
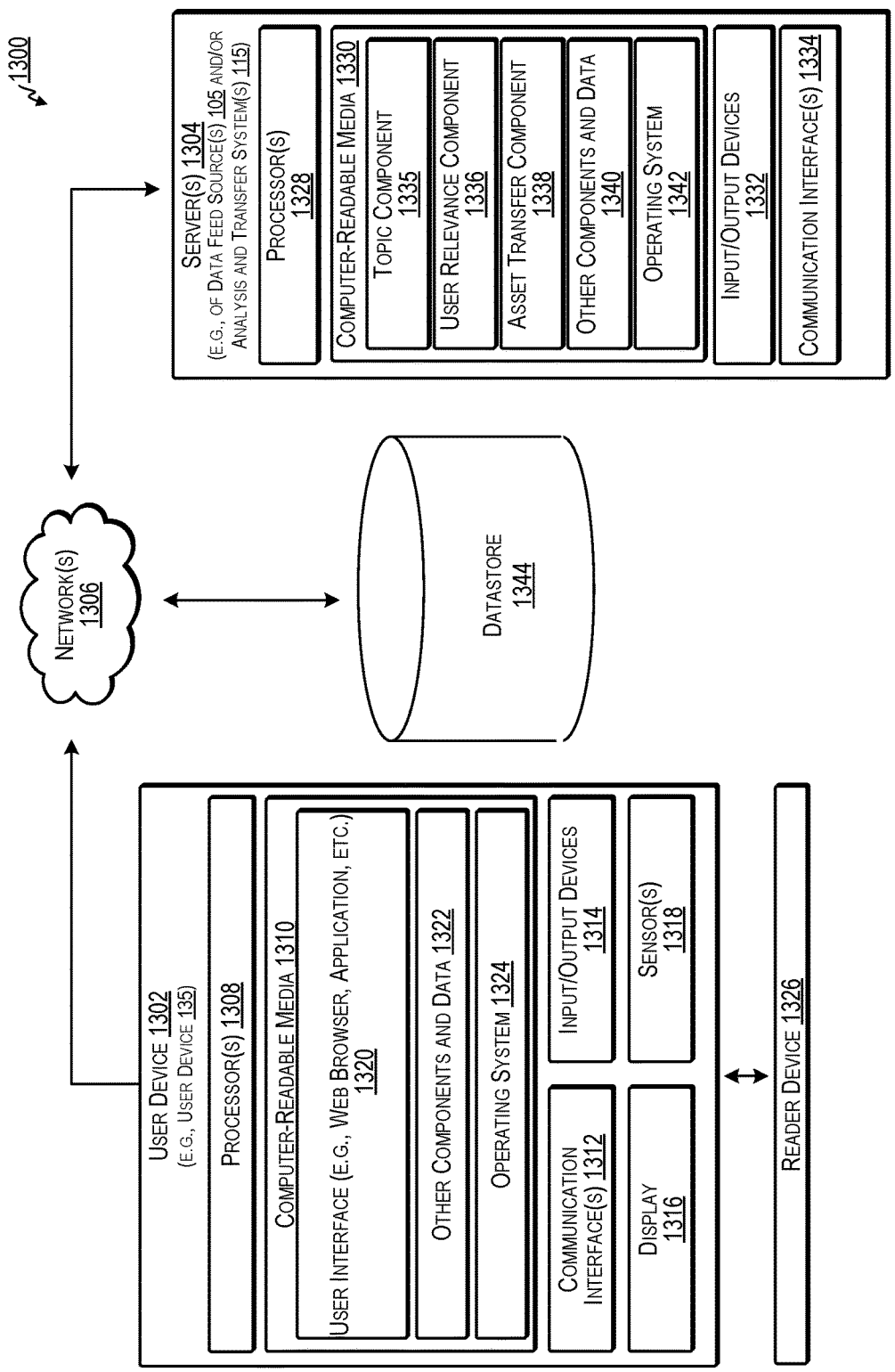
FIG. 13 is a block diagram illustrating a system for performing techniques described herein, in accordance with some examples.

FIG. 13 block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 10.

In some examples, any of the devices and/or elements in the system 1300 (e.g., the user device 1302, the server(s) 1304, the reader device(s) 1326, the datastore 1344) can include, run, or access the payment service environment 100, a payment service system, a payment platform, the data source(s) 105, the analysis and transfer system(s) 115, the user data DS 120, the trained ML model(s) 130, the user device 135, the local application 140, the distribution DS 160, the user interface 210, the user interface 215, the user interface 310, the user interface 315, the user interface 410, the user interface 415, the user interface 510, the user interface 515, the user interface 610, the user interface 615, the NN 700, the analysis and transfer system that performs the process 800, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, or a combination thereof.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a trending causes component 1335 that identifies trending causes from the dynamic information feeds (e.g., dynamic information feeds 110A-110C), a user relevance component 1336 that identifies the at least one trending cause that is relevant to the user 145 and/or to the user device 135, an asset transfer component 1338 that facilitates the transfer of asset(s) from account(s) associated with the user 145 to account(s) associated with recipient entities associated with the relevant trending cause according to a specified distribution of the distributions 165, and other components and data 1340.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 914 and/or for sending users 914 notifications regarding available appointments with merchant(s) located proximate to the users 914. In at least one example, location can be used for taking payments from nearby customers when they leave a geofence, or location can be used to initiate an action responsive to users 914 enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the analysis and transfer system(s) 115 and/or other element(s) of the payment service environment 100 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider and/or payment processing service. Functional components stored in the computer-readable media 1310 can include a trending causes component 1335 that identifies trending causes from the dynamic information feeds (e.g., dynamic information feeds 110A-110C), a user relevance component 1336 that identifies the at least one trending cause that is relevant to the user 145 and/or to the user device 135, an asset transfer component 1338 that facilitates the transfer of asset(s) from account(s) associated with the user 145 to account(s) associated with recipient entities associated with the relevant trending cause according to a specified distribution of the distributions 165, and other components and data 1340.

Further, the one or more other components and data 1340 can include programs, drivers, etc., and the data used or generated by the functional components, such as any elements described herein as used by the payment service environment 100, a payment service system, a payment platform, the data source(s) 105, the analysis and transfer system(s) 115, the user data DS 120, the trained ML model(s) 130, the user device 135, the local application 140, the distribution DS 160, the user interface 210, the user interface 215, the user interface 310, the user interface 315, the user interface 410, the user interface 415, the user interface 510, the user interface 515, the user interface 610, the user interface 615, the NN 700, the analysis and transfer system that performs the process 800, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, or a combination thereof. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the payee currency account(s) 170, the payee security asset account(s) 172, and the payee cryptocurrency account(s) 174, described above with reference to FIG. 1, can include or be associated with the merchant profiles and/or customer profiles described above.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example aspects of the disclosure include:

Aspect 1. A method, implemented by at least one computing device, the method comprising: providing, by the at least one computing device, a local application to a user mobile device associated with a user for installation on the user mobile device; monitoring, by the at least one computing device, data associated with a dynamic information feed, wherein monitoring the data includes parsing the data; determining, by the at least one computing device and based on the monitoring, a plurality of trending causes; accessing, by the at least one computing device, user information associated with the user; identifying, by the at least one computing device and based on the user information about the user, a trending cause that is relevant to the user of the plurality of trending causes; transmitting, from the at least one computing device to the user mobile device, a recommendation alert that is formatted based on the local application that is stored on the user mobile device; causing, based on transmitting the recommendation alert, the user mobile device to activate the local application to output the recommendation alert using the user mobile device to recommend the trending cause that is relevant to the user within an interface of the local application on the user mobile device; receiving, by the at least one computing device, an indication of an interaction with the recommendation alert via the user mobile device; determining, by the at least one computing device and based on an identifier associated with the trending cause that is relevant to the user, a specified distribution of at least one specified recipient entity associated with the trending cause that is relevant to the user; and facilitating, by the at least one computing device and in response to receiving the indication, at least one transfer of at least one asset from an account associated with the user to at least one account associated with at least one specified recipient entity associated with the trending cause that is relevant to the user according to a specified distribution.

Aspect 2. The method of Aspect 1, wherein identifying the trending cause that is relevant to the user of the plurality of trending causes is also based on contextual information associated with at least one user activity of the user.

Aspect 3. The method of any of Aspects 1 to 2, wherein the at least one transfer includes at least one of a donation to an entity associated with the trending cause that is that is relevant to the user, a tip for the entity, a purchase from the entity, or an investment in the entity.

Aspect 4. A method, implemented by at least one computing device, the method comprising: monitoring, by the at least one computing device, data associated with a dynamic information feed; determining, by the at least one computing device and based on the monitoring, a plurality of trending causes; accessing, by the at least one computing device, user information associated with a user; identifying, by the at least one computing device and based on the user information about the user, a trending cause that is relevant to the user of the plurality of trending causes; transmitting, from the at least one computing device to a user mobile device associated with the user, a recommendation alert that is formatted based on a local application that is stored on the user mobile device; causing the user mobile device to surface the recommendation alert to recommend the trending cause that is relevant to the user within an interface of the local application on the user mobile device; receiving, by the at least one computing device, an indication of an interaction with the recommendation alert via the user mobile device; and facilitating, by the at least one computing device and in response to receiving the indication, at least one transfer of at least one asset from an account associated with the user to at least one account associated with at least one specified recipient entity associated with the trending cause that is relevant to the user according to a specified distribution.

Aspect 5. The method of Aspect 4, further comprising: parsing the data associated with a dynamic information feed; and identifying respective frequencies at which a plurality of causes are indicated in the dynamic information feed, wherein the determining of the plurality of trending causes is based on the respective frequencies at which the plurality of causes are indicated in the dynamic information feed.

Aspect 6. The method of any of Aspects 4 to 5, wherein identifying the trending cause that is relevant to the user of the plurality of trending causes is also based on contextual information associated with at least one user activity of the user.

Aspect 7. The method of any of Aspects 4 to 6, wherein identifying the trending cause that is relevant to the user of the plurality of trending causes is also based on an output of a trained machine learning model in response to input of at least the plurality of trending causes and the user information into the trained machine learning model.

Aspect 8. The method of any of Aspects 4 to 7, wherein the dynamic information feed includes at least one of a social media post feed, a news feed from a news source, a weather feed from a weather source, or a local feed from the local application.

Aspect 9. The method of any of Aspects 4 to 8, wherein the user information includes at least one of a purchase history of the user, a music playback history of the user, a video playback history of the user, a location history of the user, demographic information about the user, residence information about the user, one or more social network connections from the user to one or more additional users, or a previously-identified preference of the user.

Aspect 10. The method of any of Aspects 4 to 9, further comprising: aggregating, by the at least one computing device, the at least one transfer with at least one additional transfer for a tax ledger associated with the user, wherein the tax ledger is configured for use in preparing an electronic tax return.

Aspect 11. The method of any of Aspects 4 to 10, wherein the interface of the local application is associated with payment for a transaction by the user, and wherein transmitting the recommendation alert causes the user mobile device to surface the recommendation alert to recommend the trending cause that is relevant to the user within the interface of the local application on the user mobile device based on the payment for the transaction by the user.

Aspect 12. The method of any of Aspects 4 to 11, wherein the at least one transfer includes at least one of a donation to an entity associated with the trending cause that is that is relevant to the user, a tip for the entity, a purchase from the entity, or an investment in the entity.

Aspect 13. The method of any of Aspects 4 to 12, wherein the trending cause that is that is relevant to the user is associated with environmental sustainability, and wherein the user information is based on a history of the user with environmental sustainability over a predetermined time period.

Aspect 14. The method of any of Aspects 4 to 13, further comprising: creating, by the at least one computing device, a plurality of identifiers corresponding to the plurality of trending causes; and generating, by the at least one computing device, a plurality of records for a data store associated with the plurality of trending causes, wherein a record of the plurality of records includes an association between an identifier of the plurality of identifiers and a distribution of at least one recipient entity associated with a trending cause of the plurality of trending causes, wherein the specified distribution and the at least one specified recipient entity associated with the trending cause that is relevant to the user are determined based on the data store.

Aspect 15. The method of any of Aspects 4 to 14, further comprising: querying, by the at least one computing device, a data store using a specified identifier associated with the trending cause that is relevant to the user to determine a specified distribution of the at least one specified recipient entity associated with the trending cause that is relevant to the user.

Aspect 16. The method of any of Aspects 4 to 15, wherein facilitating the at least one transfer includes of the at least one asset includes facilitating a plurality of transfers periodically according to a predetermined schedule, wherein each of the plurality of transfers is a transfer of the at least one asset from the account associated with the user to the at least one account associated with the at least one specified recipient entity associated with the trending cause that is relevant to the user according to the specified distribution.

Aspect 17. The method of any of Aspects 4 to 16, further comprising: generating, by the at least one computing device, an interactive element that encodes the recommendation alert, wherein transmitting the recommendation alert includes transmitting the interactive element, wherein causing the user mobile device to surface the recommendation alert occurs in response to the user mobile device interacting with the interactive element, and wherein the indication of the interaction with the recommendation alert is an indication of the user mobile device interacting with the interactive element.

Aspect 18. The method of any of Aspects 4 to 17, further comprising: generating, by the at least one computing device, an interactive element that encodes the recommendation alert, wherein causing the user mobile device to surface the recommendation alert includes causing the user mobile device to surface the interactive element, and wherein the indication of the interaction with the recommendation alert is an indication that a second user mobile device interacted with the interactive element while the interactive element is surfaced at the user mobile device.

Aspect 19. A system comprising: at least one memory; and at least one processor coupled to the at least one memory, the at least one processor configured to: monitor data associated with a dynamic information feed; determine, based on the monitoring, a plurality of trending causes; access user information associated with a user; identify, based on the user information about the user, a trending cause that is relevant to the user of the plurality of trending causes; transmit, to a user mobile device associated with the user, a recommendation alert that is formatted based on a local application that is stored on the user mobile device; cause the user mobile device to surface the recommendation alert to recommend the trending cause that is relevant to the user within an interface of the local application on the user mobile device; receive an indication of an interaction with the recommendation alert via the user mobile device; and facilitate, in response to receiving the indication, at least one transfer of at least one asset from an account associated with the user to at least one account associated with at least one specified recipient entity associated with the trending cause that is relevant to the user according to a specified distribution.

Aspect 20. The system of Aspect 19, wherein the at least one transfer includes at least one of a donation to an entity associated with the trending cause that is that is relevant to the user, a tip for the entity, a purchase from the entity, or an investment in the entity.

What is claimed is:

1. A method, implemented by at least one computing device, the method comprising:
monitoring data from a plurality of interfaces in a distributed network, wherein different interfaces of the plurality of interfaces are associated with different users of a plurality of users, wherein the plurality of users include a first user and a second user;
analyzing the data to identify a message among the data from the plurality of interfaces, wherein the message corresponds to a user preference of the first user, wherein the message is shared by the second user;
causing, based on the identifying of the message, a user mobile device of the first user to output a recommendation alert to recommend a transfer of a cryptocurrency asset between a first account of the first user and a second account of the second user;
receiving an indication of an interaction with the recommendation alert via the user mobile device;
facilitating, in response to receiving the indication, the transfer of the cryptocurrency asset between the first account of the first user and the second account of the second user; and
graphically associating the transfer of the cryptocurrency asset with the message in a graphical user interface presented via an application associated with the distributed network.

2. The method of claim 1, wherein an interface of the plurality of interfaces is associated with at least one of a charity, a merchant, a government, an organization, or a group.

3. The method of claim 1, wherein an interface of the plurality of interfaces includes at least one of a web interface in a browser, a mobile interface, or a native interface.

4. The method of claim 1, wherein the message is at least one of a chat message, a social media post, a forum post, a news headline, a news article, a record of a transaction, information associated with audio, travel information, or tax information.

5. A method, implemented by at least one computing device, the method comprising:
monitoring data from a plurality of interfaces in a distributed network, wherein different interfaces of the plurality of interfaces are associated with different users of a plurality of users, wherein the plurality of users include a first user and a second user;
analyzing the data to identify a message among the data, wherein the message corresponds to a user preference of the first user, wherein the message is shared by the second user;
causing, based on the identifying of the message, a user mobile device of the first user to output a recommendation alert to recommend a transfer of a cryptocurrency asset between a first account of the first user and a second account of the second user;
receiving an indication of an interaction with the recommendation alert via the user mobile device;

facilitating, in response to receiving the indication, the transfer of the cryptocurrency asset between the first account of the first user and the second account of the second user; and graphically associating the transfer of the cryptocurrency asset with the message in a graphical user interface presented via an application associated with the distributed network.

6. The method of claim 5, wherein an interface of the plurality of interfaces is associated with at least one of a charity, a merchant, a government, an organization, or a group.

7. The method of claim 5, wherein an interface of the plurality of interfaces includes at least one of a web interface in a browser, a mobile interface, or a native interface.

8. The method of claim 5, wherein message is at least one of a chat message, a social media post, a forum post, a news headline, a news article, a record of a transaction, information associated with audio, travel information, or tax information.

9. The method of claim 5, wherein the message is associated with a platform, wherein the first user is subscribed to the platform, wherein the platform is associated with at least one of a service or a forum.

10. The method of claim 5, wherein the distributed network is associated with a blockchain ledger.

11. The method of claim 5, wherein the analyzing of the data to identify the message includes identifying the message based on a frequency with which content associated with the message appears in the data.

12. The method of claim 5, wherein the analyzing of the data to identify the message includes identifying the message based on a recency with which content associated with the message appears in the data.

13. The method of claim 5, wherein the cryptocurrency asset is a fractional share of a unit of a cryptocurrency.

14. The method of claim 5, wherein the user is subscribed to different interfaces of the plurality of interfaces.

15. A system comprising:
at least one memory storing instructions; and
at least one processor that executes the instructions, wherein execution of the instructions causes the at least one processor to:
monitor data from a plurality of interfaces in a distributed network, wherein different interfaces of the plurality of interfaces are associated with different users of a plurality of users, wherein the plurality of users include a first user and a second user;
analyze the data to identify a message among the data, wherein the message corresponds to a user preference of the first user, wherein the message is shared by the second user;
cause, based on the identifying of the message, a user mobile device of the first user to output a recommendation alert to recommend a transfer of a cryptocurrency asset between a first account of the first user and a second account of the second user;
receive an indication of an interaction with the recommendation alert via the user mobile device;
facilitate, in response to receiving the indication, the transfer of the cryptocurrency asset between the first account of the first user and the second account of the second user; and
graphically associate the transfer of the cryptocurrency asset with the message in a graphical user interface presented via an application associated with the distributed network.

16. The system of claim 15, wherein an interface of the plurality of interfaces is associated with at least one of a charity, a merchant, a government, an organization, or a group.

17. The system of claim 15, wherein an interface of the plurality of interfaces includes at least one of a web interface in a browser, a mobile interface, or a native interface.

18. The system of claim 15, wherein message is at least one of a chat message, a social media post, a forum post, a news headline, a news article, a record of a transaction, information associated with audio, travel information, or tax information.

19. The system of claim 15, wherein the distributed network is associated with a blockchain ledger.

20. The system of claim 15, wherein the analyzing of the data to identify the message includes identifying the message based on at least one of a frequency with which content associated with the message appears in the data or a recency with which the content associated with the message appears in the data.

21. The system of claim 15, wherein the cryptocurrency asset is a fractional share of a unit of a cryptocurrency.

* * * * *